United States Patent
Holtsclaw et al.

(10) Patent No.: US 10,253,244 B2
(45) Date of Patent: Apr. 9, 2019

(54) SCALE-INHIBITING COCRYSTALS FOR TREATMENT OF A SUBTERRANEAN FORMATION

(71) Applicant: Halliburton Energy Services, Inc., Houston, TX (US)

(72) Inventors: Jeremy A. Holtsclaw, Kingwood, TX (US); Nathan Carl Schultheiss, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/897,431

(22) PCT Filed: Sep. 4, 2013

(86) PCT No.: PCT/US2013/057975
§ 371 (c)(1),
(2) Date: Dec. 10, 2015

(87) PCT Pub. No.: WO2015/034478
PCT Pub. Date: Mar. 12, 2015

(65) Prior Publication Data
US 2016/0130496 A1 May 12, 2016

(51) Int. Cl.
*C09K 8/03* (2006.01)
*C09K 8/62* (2006.01)
(Continued)

(52) U.S. Cl.
CPC ............. *C09K 8/528* (2013.01); *C04B 28/02* (2013.01); *C09K 8/03* (2013.01); *C09K 8/467* (2013.01);
(Continued)

(58) Field of Classification Search
CPC ... C09K 8/86; Y10S 507/902; Y10S 507/927; Y10S 507/934
(Continued)

(56) References Cited

U.S. PATENT DOCUMENTS

| | | |
|---|---|---|
| 5,224,543 A | 7/1993 | Watkins et al. |
| 6,063,290 A | 5/2000 | Failon |

(Continued)

FOREIGN PATENT DOCUMENTS

WO WO-2015034478 A1 3/2015

OTHER PUBLICATIONS

"International Application Serial No. PCT/US2013/057975, International Preliminary Report on Patentability dated Mar. 17, 2016", 8 pgs.

(Continued)

*Primary Examiner* — Aiqun Li
(74) *Attorney, Agent, or Firm* — Chamberlain Hrdlicka

(57) ABSTRACT

The present invention relates to cocrystals including a scale-inhibiting compound, and methods of using the cocrystals for treating a subterranean formation. In various embodiments, the present invention provides a method of treating a subterranean formation including obtaining or providing a composition including cocrystals. Each cocrystal independently includes a scale-inhibiting compound and a secondary material. The method also includes placing the composition in a subterranean formation.

19 Claims, 1 Drawing Sheet

(51) Int. Cl.

| | |
|---|---|
| *C09K 8/68* | (2006.01) |
| *C09K 8/72* | (2006.01) |
| *C09K 8/80* | (2006.01) |
| *C09K 8/92* | (2006.01) |
| *C04B 24/16* | (2006.01) |
| *C04B 24/26* | (2006.01) |
| *C09K 8/467* | (2006.01) |
| *C09K 8/528* | (2006.01) |
| *E21B 37/06* | (2006.01) |
| *C09K 8/524* | (2006.01) |
| *C09K 8/88* | (2006.01) |
| *C09K 8/90* | (2006.01) |
| *C04B 28/02* | (2006.01) |

(52) U.S. Cl.
CPC ............... *C09K 8/524* (2013.01); *C09K 8/62* (2013.01); *C09K 8/685* (2013.01); *C09K 8/72* (2013.01); *C09K 8/805* (2013.01); *C09K 8/887* (2013.01); *C09K 8/90* (2013.01); *C09K 8/92* (2013.01); *E21B 37/06* (2013.01); *C09K 2208/10* (2013.01); *Y02W 30/92* (2015.05)

(58) Field of Classification Search
USPC ......... 507/90, 219, 221, 224, 226, 237, 267, 507/269, 274, 231
See application file for complete search history.

(56) References Cited

U.S. PATENT DOCUMENTS

| | | | |
|---|---|---|---|
| 6,379,612 | B1 | 4/2002 | Reizer et al. |
| 7,833,947 | B1* | 11/2010 | Kubala ................. C09K 8/536 |
| | | | 166/305.1 |
| 8,350,085 | B2 | 1/2013 | Childs |
| 2002/0071783 | A1 | 6/2002 | Fader et al. |
| 2003/0119701 | A1* | 6/2003 | Demeyere ................ C11D 1/62 |
| | | | 510/327 |
| 2005/0194137 | A1* | 9/2005 | Nguyen ................. C09K 8/508 |
| | | | 166/276 |
| 2006/0124302 | A1* | 6/2006 | Gupta .................... C09K 8/516 |
| | | | 166/279 |
| 2009/0025933 | A1 | 1/2009 | Garcia-Lopez de Victoria et al. |
| 2011/0108277 | A1* | 5/2011 | Dudley ............... E21B 43/2401 |
| | | | 166/308.1 |

OTHER PUBLICATIONS

"International Application Serial No. PCT/US2013/057975, International Search Report dated Jun. 9, 2014".

"International Application Serial No. PCT/US2013/057975, Written Opinion dated Jun. 9, 2014".

Bethune, S. J., et al., "Improving the Poor Aqueous Solubility of Nutraceutical Compound Pterostilbene through Cocrystal Formation", Crystal Growth & Design, 11(7), (2011), 2817-2823.

Rodriguez-Hornedo, N., "Cocrystals: The future of improving solubility?", (2013), 34 pgs.

* cited by examiner

SCALE-INHIBITING COCRYSTALS FOR TREATMENT OF A SUBTERRANEAN FORMATION

PRIORITY APPLICATION

This application is a U.S. National Stage Filing under 35 U.S.C. 371 from International Application No. PCT/US2013/057975, filed Sep. 4, 2013; and published as WO 2015/034478 on Mar. 12, 2015; which application and publication are incorporated herein by reference in their entirety.

BACKGROUND OF THE INVENTION

In the oilfield, scale is a solid that precipitates out of solution or accumulates on the surface of subterranean materials, such as in fractures or subterranean flow pathways, or on equipment downhole, such as production tubing, gravel packing screens, or on equipment above the surface. Scale is a mineral or solid that is formed due to scale-forming ions that are present in water or petroleum downhole, such as $Fe^{2+}$, $Ca^{2+}$, $Mg^{2+}$, $Sr^{2+}$, and $Ba^{2+}$. Examples of scale include carbonate salts, sulfate or sulfide salts, such as $BaSO_4$, $SrSO_4$, $CaSO_4$, and $CaCO_3$. Scale can decrease the permeability of a subterranean formation, reduce well productivity, and shorten the lifetime of production equipment. Cleaning and removal of scale generally requires stopping production and is both time-consuming and costly. Scale control challenges are a leading cause of declining production worldwide. Scale costs the petroleum industry millions of dollars each year in scale control and removal costs and in deferred production.

Hydraulic fracturing is an important technique that includes placing or extending channels from the wellbore to the reservoir. This operation includes hydraulically injecting a fracturing fluid into a wellbore penetrating or adjacent to a petroleum-producing subterranean formation and forcing the fracturing fluid against the surrounding subterranean material by pressure. The subterranean material is forced to crack, creating or enlarging one or more fractures. Proppant can be placed in fractures to prevent or reduce closure. The fractures can provide flow or can provide improved flow of the recoverable fluids from the formation, such as petroleum materials.

Viscous fluids are frequently used during downhole operations. For example, during a pad stage of fracturing, a fluid including viscosifer can be injected to begin to break into an area and initiate fractures to produce sufficient penetration and width to allow proppant-laden later stages to enter. In other examples, during various downhole operations solid materials are formed into a suspension with a viscous fluid and injected downhole. For example, during the slurry phase of hydraulic fracturing operations, a suspension of proppant is formed with fracturing fluid and injected downhole for deposition in fractures. Another example includes gravel pack operations, wherein a suspension of gravel is formed in a viscous fluid for transport downhole. Scale control can be valuable during operations including the injection of a suspension downhole. For example, during the slurry phase of hydraulic fracturing, as fractures are formed or widened, often water can be struck, causing infusion of water containing scale-forming ions into the fracture and wellbore and subsequent undesirable formation of scale.

Viscous fluids for downhole operations are often formed using a gel or crosslinked gel and a crosslinker that contains a metal or transition metal such as at least one of chromium, aluminum, antimony, zirconium, titanium, calcium, boron, iron, silicon, copper, zinc, magnesium, and an ion thereof. When scale inhibitors are exposed to crosslinkers, the scale inhibitor tends to chelate or bind to the metal or transition metal, which reduces or entirely eliminates the ability of the scale inhibitor to effectively inhibit scale. Therefore, current scale inhibitors are incompatible with viscous fluids including crosslinkers, making scale difficult to inhibit during various scale-prone downhole operations that include the use of viscous fluids.

SUMMARY OF THE INVENTION

In various embodiments, the present invention provides a method of treating a subterranean formation. The method includes obtaining or providing a composition including cocrystals. Each cocrystal independently includes a scale-inhibiting compound and a secondary material. The method also includes placing the composition in a subterranean formation.

In various embodiments, the present invention provides a method of treating a subterranean formation. The method includes obtaining or providing a composition including cocrystals. Each cocrystal independently includes a scale-inhibiting compound and a secondary material. The composition also includes a compound including at least one of chromium, aluminum, antimony, zirconium, titanium, calcium, boron, iron, silicon, copper, zinc, magnesium, and an ion thereof. The method also includes placing the composition in a subterranean formation.

In various embodiments, the present invention provides a system. The system includes a composition including cocrystals. Each cocrystal independently includes a scale-inhibiting compound and a secondary material. The system also includes a subterranean formation comprising the composition therein.

In various embodiments, the present invention provides a composition for treatment of a subterranean formation. The composition includes cocrystals. Each cocrystal independently includes a scale-inhibiting compound and a secondary material.

In various embodiments, the present invention provides a method of preparing a composition for treatment of a subterranean formation. The method includes forming a composition including cocrystals. Each cocrystal independently includes a scale-inhibiting compound and a secondary material.

Various embodiments of the present invention provide certain advantages over other methods of treating a subterranean formation, such as other methods of using scale inhibitors downhole, at least some of which are unexpected. In various embodiments, depending on the type of secondary material used with the scale inhibitor in the cocrystals, the cocrystals can have different properties than the scale inhibitor in non-cocrystal form, such as at least one of different reactivity, solubility, dissolution rate, melting point, and density. However, cocrystals can rely on hydrogen bonding and other noncovalent interactions to form the cocrystal form. Thus, in various embodiments, despite the modulated properties, the cocrystal advantageously includes the unmodified scale inhibitor compound therein, such that upon release or dissociation the scale inhibitor is identical to a scale inhibitor that did not originate from a cocrystal.

In some embodiments, the cocrystals including the scale inhibitor can have greater compatibility with certain chemical environments and greater effectiveness therein, as compared to other scale inhibitors which can experience decreased performance in similar environments. Thus, in various embodiments, the cocrystals can have compatibility with a greater variety of chemical environments and downhole services than other scale inhibitors. Some embodiments of the cocrystals include secondary materials having no or little scale-inhibition properties but that optionally have other useful properties for use downhole, while other embodiments of the cocrystals include secondary materials having scale-inhibition properties allowing for the combining of properties of one scale-inhibiting material with another.

In various embodiments, depending on the type of secondary material in the cocrystal and the desired use, the release of the scale inhibitor can be designed to occur over time or can be triggered by various external events in the particular downhole environment of intended use, allowing for a large degree of customizability in how the cocrystal is utilized. In various embodiments, the cocrystals can enable an extended release or a time-delay release of the scale inhibitor from the cocrystal, preventing the scale inhibitor from being consumed or made less available by reaction with the crosslinkers. In some embodiments, the extended release or time-delay release can occur without any coating material, such as coating materials used in other extended release of time-delay release materials, which can avoid coating issues such as inconvenience, environmental impact, cost, and other issues. In various embodiments, the cocrystals can enable a triggered release of the scale inhibitors, such as by an event triggered from the surface or by a local downhole event, such as by a release of water or oil.

Compositions including gels or crosslinked gels and crosslinkers are often used during downhole operations, for example including proppants during the slurry stage of fracturing wherein the proppant suspension forms, widens, and holds open fractures. In some embodiments, the cocrystals can be effectively used for scale inhibition in the presence of crosslinkers, such as compounds including at least one of chromium, aluminum, antimony, zirconium, titanium, calcium, boron, iron, silicon, copper, zinc, magnesium, and an ion thereof, which are often found in crosslinked gels used to increase viscosity of downhole compositions.

BRIEF DESCRIPTION OF THE FIGURES

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION OF THE INVENTION

Figure 1:
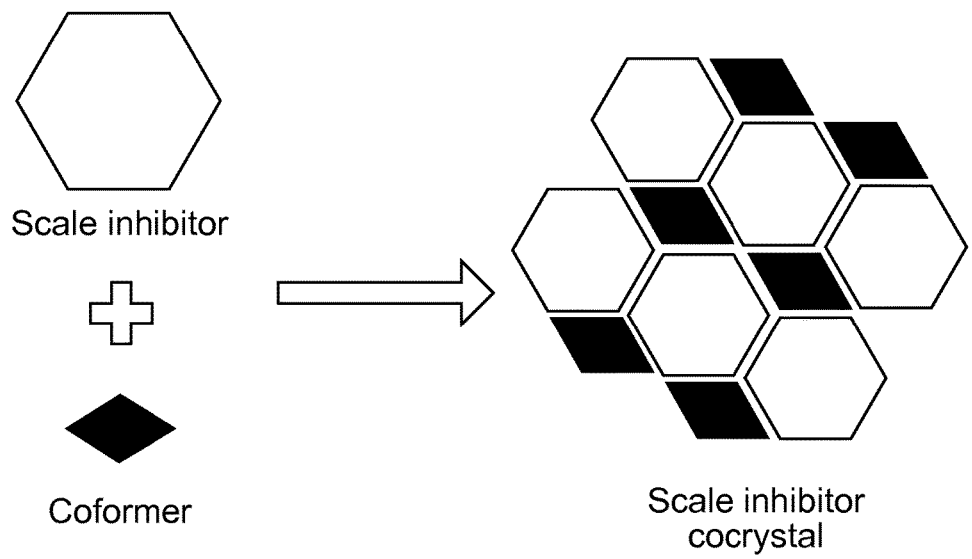
FIG. 1 illustrates a scale inhibitor cocrystal, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Selected substituents within the compounds described herein are present to a recursive degree. In this context, "recursive substituent" means that a substituent may recite another instance of itself or of another substituent that itself recites the first substituent. Recursive substituents are an intended aspect of the disclosed subject matter. Because of the recursive nature of such substituents, theoretically, a large number may be present in any given claim. One of ordinary skill in the art of organic chemistry understands that the total number of such substituents is reasonably limited by the desired properties of the compound intended. Such properties include, by way of example and not limitation, physical properties such as molecular weight, solubility, and practical properties such as ease of synthesis. Recursive substituents can call back on themselves any suitable number of times, such as about 1 time, about 2 times, 3, 4, 5, 6, 7, 8, 9, 10, 15, 20, 30, 50, 100, 200, 300, 400, 500, 750, 1000, 1500, 2000, 3000, 4000, 5000, 10,000, 15,000, 20,000, 30,000, 50,000, 100,000, 200,000, 500,000, 750, 000, or about 1,000,000 times or more.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as alkoxy groups, aryloxy groups, aralkyloxy groups, oxo(carbonyl) groups, carboxyl groups including carboxylic acids, carboxylates, and carboxylate esters; a sulfur-containing group such as alkyl and aryl sulfide groups; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R wherein R can be hydrogen (in examples that include other carbon atoms) or a carbon-based moiety, and wherein the carbon-based moiety can itself be further substituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule, or onto an organic group. Examples of substituents or functional groups include, but are not limited to, a halogen (e.g., F, Cl, Br, and I); an oxygen atom in groups such as hydroxyl groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxylamines, nitriles, nitro groups, N-oxides, hydrazides, azides, and enamines; and other heteroatoms in various other groups. Non-limiting examples of substituents J that can be bonded to a substituted carbon (or other) atom include F, Cl, Br, I, OR, OC(O)N(R')$_2$, CN, NO, NO$_2$, ONO$_2$, azido, CF$_3$, OCF$_3$, R', O (oxo), S (thiono), C(O), S(O), methylenedioxy, ethylenedioxy, N(R)$_2$, SR, SOR, SO$_2$R', SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R wherein R can be hydrogen or a carbon-based moiety, and wherein the carbon-based moiety can itself be further substituted; for example, wherein R can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or R can be independently mono- or multi-substituted with J; or wherein two R groups bonded to a nitrogen atom or to adjacent nitrogen atoms can together with the nitrogen atom or atoms form a heterocyclyl, which can be mono- or independently multi-substituted with J.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) group is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "aralkyl" as used herein refers to alkyl groups as defined herein in which a hydrogen or carbon bond of an alkyl group is replaced with a bond to an aryl group as defined herein. Representative aralkyl groups include benzyl and phenylethyl groups and fused (cycloalkylaryl)alkyl groups such as 4-ethyl-indanyl. Aralkenyl group are alkenyl groups as defined herein in which a hydrogen or carbon bond of an alkyl group is replaced with a bond to an aryl group as defined herein.

The term "heterocyclyl" as used herein refers to aromatic and non-aromatic ring compounds containing 3 or more ring members, of which, one or more is a heteroatom such as, but not limited to, N, O, and S. Thus a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a $C_2$-heterocyclyl can be a 5-ring with two carbon atoms and three heteroatoms, a 6-ring with two carbon atoms and four heteroatoms and so forth. Likewise a $C_4$-heterocyclyl can be a 5-ring with one heteroatom, a 6-ring with two heteroatoms, and so forth. The number of carbon atoms plus the number of heteroatoms sums up to equal the total number of ring atoms. A heterocyclyl ring can also include one or more double bonds. A heteroaryl ring is an embodiment of a heterocyclyl group. The phrase "heterocyclyl group" includes fused ring species including those that include fused aromatic and non-aromatic groups.

The terms "halo" or "halogen" or "halide", as used herein, by themselves or as part of another substituent mean, unless otherwise stated, a fluorine, chlorine, bromine, or iodine atom, preferably, fluorine, chlorine, or bromine.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof.

The term "solvent" as used herein refers to a liquid that can dissolve a solid, liquid, or gas. Nonlimiting examples of solvents are silicones, organic compounds, water, alcohols, ionic liquids, and supercritical fluids.

The term "room temperature" as used herein refers to a temperature of about 15° C. to 28° C.

As used herein, "degree of polymerization" is the number of repeating units in a polymer.

As used herein, the term "polymer" refers to a molecule having at least one repeating unit, and can include copolymers.

The term "copolymer" as used herein refers to a polymer that includes at least two different monomers. A copolymer can include any suitable number of monomers.

The term "downhole" as used herein refers to under the surface of the earth, such as a location within or fluidly connected to a wellbore.

As used herein, the term "drilling fluid" refers to fluids, slurries, or muds used in drilling operations downhole, such as the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid, or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "production fluid" refers to fluids or slurries used downhole during the production phase of a well. Production fluids can include downhole treatments designed to maintain or increase the production rate of a well, such as perforation treatments, clean-up treatments, or remedial treatments.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments downhole. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packing fluid" refers to fluids or slurries that can be placed in the annular region of a well between tubing and outer casing above a packer. In various examples, the packing fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore; placing a material in a subterranean formation can include contacting the material with any section of a wellbore or with any subterranean region in fluid contact therewith. Subterranean materials can include any materials placed into the wellbore such as cement, drill shafts, liners, tubing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein "treatment of a subterranean formation" can include any activity directed to extraction of water or petroleum materials from a subterranean petroleum- or water-producing formation or region, for example, including drilling, stimulation, hydraulic fracturing, clean-up, acidization, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore, or vice-versa. A flow pathway can include at least one of a hydraulic fracture, a fluid connection across a screen, gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

Method of Treating a Subterranean Formation

Figure 2:
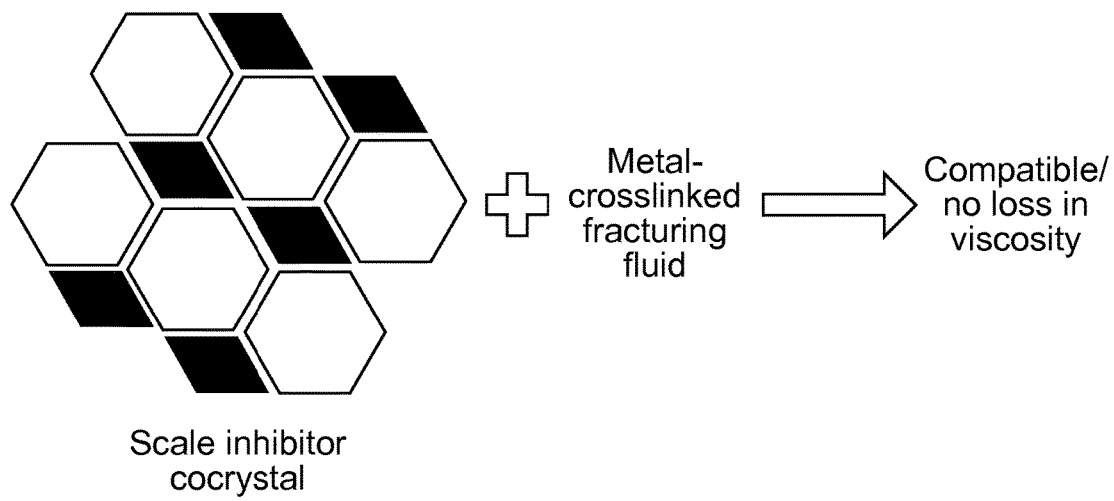
FIG. 2 illustrates a scale inhibitor cocrystal in the presence of a fracturing fluid, in accordance with various embodiments.

Various embodiments of the present invention can provide a scale inhibitor that can inhibit production of scale downhole and that can address incompatibility issues with other stimulation chemicals and services. Embodiments include the use of scale inhibitors in the form of cocrystals, for example, including a scale inhibitor and an inert chemical component. Cocrystals (multicomponent materials) can allow the tuning of various physical properties (e.g., solubility, dissolution rate, melting point, density) of the scale inhibitors (FIG. 1). Various embodiments include cocrystals including different types of scale inhibitors, allowing for the treatment of multiple scale issues in a single material. Once downhole, within or near to the fracture, an external stimulus, pressure (e.g., closure stress), temperature (e.g, bottom hole temperature), time, pH change, or other trigger mechanism, can be used to trigger a dissociation of the scale inhibitor (FIG. 2) and generate the reactive species.

In some embodiments, the present invention provides a method of treating a subterranean formation. The method can include obtaining or providing a composition including cocrystals, each cocrystal independently including a scale-inhibiting compound, and a secondary material. The obtaining or providing of the composition can occur at any suitable time and at any suitable location. The obtaining or providing of the composition can occur above the surface. The obtaining or providing of the composition can occur downhole. The method can also include placing the composition in a subterranean formation downhole. Placing the composition in the subterranean formation can include contacting any suitable part of the subterranean formation and the composition, or contacting the composition and a subterranean material downhole, such as any suitable subterranean material. In some embodiments, the composition can include a compound including at least one of chromium, aluminum, antimony, zirconium, titanium, calcium, boron, iron, silicon, copper, zinc, magnesium, and an ion thereof. The method can be a method of inhibiting scale formation downhole during any suitable downhole operation. The method can include inhibiting scale downhole or above the surface. The subterranean formation can be any suitable subterranean formation. In some examples, the placing of the composition in the subterranean formation includes contacting the composition with or placing the composition in at least one of a fracture, at least a part of an area surrounding a fracture, a flow pathway, an area surrounding a flow pathway, and an area desired to be fractured. The placing of the composition in the subterranean formation can be any suitable placing, and can include any suitable contacting between the subterranean formation and the composition, wherein the cocrystals can contact the subterranean formation as a slurry, or can sit on or otherwise contact the surface of the subterranean formation in a greater concentration than present in the surrounding solution. In some embodiments, the placing of the composition in the subterranean formation can include placing a cocrystal-coated proppant in the subterranean formation. The placing of the composition in the subterranean formation can include at least partially depositing the cocrystals in a fracture, flow pathway, or area surrounding the same, or contacting a fracture, flowpath, or area surrounding the same with a slurry including the cocrystals.

The method can be a method of hydraulic fracturing, such as a method of hydraulic fracturing to generate a fracture or flow pathway. The placing of the composition in the subterranean formation or the contacting of the subterranean material can occur at any time with respect to the hydraulic fracturing, for example, the hydraulic fracturing can occur at least one of before, during, and after the contacting or the placing. In some embodiments, the contacting or placing occurs during the hydraulic fracturing, such as during any suitable stage of the hydraulic fracturing, such as during at least one of pre-pad stage (e.g., during injection of water with no proppant, and additionally optionally mid- to low-strength acid), a pad stage (e.g., during injection of fluid only with no proppant, with some viscosifier, such as to begin to break into an area and initiate fractures to produce sufficient penetration and width to allow proppant-laden later stages to enter) or a slurry stage of the fracturing (e.g., viscous fluid with proppant).

The method can include performing a stimulation treatment at least one of before, during, and after placing the composition in the subterranean formation in the fracture, flow pathway, or area surrounding the same. The stimulation treatment can be, for example, at least one of perforating, acidization, injecting of cleaning fluids, propellant stimulation, and hydraulic fracturing. In some embodiments, the stimulation treatment at least partially generates a fracture or flow pathway where the composition is placed or contacted, or the composition is placed or contacted to an area surrounding the generated fracture or flow pathway. The placing of the composition in the subterranean formation or the contacting of the subterranean formation and the composition including the cocrystals can occur during a squeeze operation.

In some embodiments, the cocrystals or a composition including the cocrystals is at least partially coated on a proppant. The coating can have any suitable thickness, such as about 1 nm to about 5 mm, or such as about 1 nm or less, or about 2 nm, 3 nm, 4 nm, 5 nm, 10 nm, 20 nm, 50 nm, 100 nm, 250 nm, 500 nm, 750 nm, 0.001 mm, 0.005 nm, 0.01 mm, 0.05 mm, 0.1 mm, 0.5 mm, 1 mm, 2 mm, 3 mm, 4 mm, or about 5 mm or more. In some embodiments, the composition including the cocrystals is least partially encapsulated by a protective shell. The protective shell can have any suitable thickness, such as about 1 nm or less, or about 2 nm, 3 nm, 4 nm, 5 nm, 10 nm, 20 nm, 50 nm, 100 nm, 250 nm, 500 nm, 750 nm, 0.001 mm, 0.005 nm, 0.01 mm, 0.05 mm, 0.1 mm, 0.5 mm, 1 mm, 2 mm, 3 mm, 4 mm, or about 5 mm or more. The protective shell can at least partially protect the cocrystals from the surrounding environment, such as the surrounding chemical environment. In some embodiments, the protective shell can be at least one of soluble, porous, and can have pore formers therein.

The scale inhibition caused by the cocrystals or the composition including the cocrystals can be any suitable inhibition, such that through any suitable mechanism scale-forming ions in the surrounding solution are caused to form less or substantially no scale as compared to a corresponding solution without the cocrystals therein. The scale inhibition by the cocrystals can include a reaction (e.g., binding interaction) between scale-forming materials (e.g., scale-forming ions) and the cocrystal. The scale inhibition can include dissociation of at least some of the scale-inhibiting compound from the cocrystal, to give a released scale-inhibiting compound, wherein the scale inhibition includes a reaction (e.g., binding interaction) between scale-forming materials (e.g., scale-forming ions) and the released scale-inhibiting compound. The released scale-inhibiting compound can be in any suitable form, such as a crystal form, or such as at least partially dissolved in the surrounding solution. The disassociation can occur at any suitable time in relation to the placing of the composition in the subterranean formation or the contacting of the composition and the subterranean material, such as at least one of before, during, and after the contacting or placing.

The composition including the cocrystals can have any suitable viscosity. In some embodiments, the viscosity at standard temperature and pressure, or under downhole conditions, is about 0.01 cP to about 10,000 cP, or about 0.05 cP to about 1,500 cP, or about 0.01 cP or less, or about 0.1 cP, 1 cP, 5 cP, 10 cP, 15 cP, 20 cP, 25 cP, 30 cP, 40 cP, 50 cP, 60 cP, 70 cP, 75 cP, 80 cP, 85 cP, 90 cP, 100 cP, 150 cP, 200 cP, 500 cP, 1000 cP, 5000 cP, of about 10,000 cP or more.

Triggering Dissociation

The scale inhibition can include dissociation of at least some of the scale-inhibiting compound from the cocrystal, to give a released scale-inhibiting compound, wherein the scale inhibition includes a reaction (e.g., binding interaction) between scale-forming materials (e.g., scale-forming ions) and the released scale-inhibiting compound. The method can include triggering the dissociation of the scale-inhibiting compound. The triggering can occur by any suitable method, so long as at least some of the scale-inhibiting compound is dissociated from the cocrystals in at least one of a crystal form or a form partially dissolved in the surrounding solution. The triggering can occur at any suitable time with respect to the placing of the composition in the subterranean formation or the contacting of the composition and the subterranean material, such as at least one of before, during, and after the contacting. The triggering can occur while at least some of the cocrystals are in a fracture, flow pathway, or area surrounding the same.

In some embodiments, the triggering can include exposing at least some of the cocrystals to at least one of a compression wave, a chemical activator, heat, pH change, pressure, friction, time, and vibration. The triggering can include exposing at least some of the cocrystals to closure of a fracture or flow pathway. For example, a compression wave caused by an explosion (e.g., a suitably placed detonator or primer), caused by sending a compression wave down the wellbore from the surface, or caused by another suitable means, can trigger the dissociation. In some embodiments, the method can include placing a detonatable material proximate to at least some of the cocrystals downhole. Heat, such as the temperature downhole, can trigger the dissociation. In some examples, heat caused by the release of petroleum materials, heat caused by the fracturing of rock, or heat caused by friction such as friction between proppant and the fracture, can cause the dissociation. Pressure can trigger the dissociation. The triggering pressure can occur naturally downhole, or can be generated by pumping from the surface. The triggering pressure can occur due to closure of the fracture on the cocrystal.

In some embodiments, pH change that triggers the dissociation can be due to chemical interactions of acid or base with the cocrystal and can occur as a result of released water or petroleum or from the addition of acid or base which can be controlled from the surface such as via coiled tubing or other suitable means. In some embodiments, pH change can cause a change in temperature that triggers the dissociation. Friction to trigger the dissociation can be generated against the inner walls of the fracture or flow pathway, for example during the placement of proppant in the fracture, such as during the placement of proppant in the fracture that is coated with or otherwise has cocrystals thereon. Friction to trigger the dissociation can be generated by the closure of the fracture. The cocrystal can be designed to dissociate after a suitable period of time in a suitable chemical environment, such as due to dissolution of a secondary component in the cocrystal or other degradation of the cocrystal over time. In some embodiments, the triggering can including breaking or chemically dissolving at least part of a protective shell that at least partially coats the cocrystals. The protective shell can be dissolved or otherwise broken down in particular chemical environments, such as in the presence of water, petroleum, acid, or base, such that upon the breakdown of the protective shell the sensitivity of the cocrystal to dissociation via various other triggers increases, thus effectively triggering the dissociation by exposure to various chemical environments. In some embodiments, vibration can trigger the dissociation, such as vibration caused by placing proppant in the fracture, vibration from the fracturing of rock, vibration caused by various downhole operations such as drilling, or vibration artificially created to trigger the dissociation.

Scale Inhibition

As used herein the term "scale" is intended to encompass any precipitate which may be formed within a hydrocarbon (i.e. oil or gas) producing system. In some examples, water proximate to or mixed with petroleum material in a formation will have high concentrations of ions that can produce scale, such as $Fe^{2+}$, and ions of group I and group II metals such $Ca^{2+}$, $Mg^{2+}$, $Sr^{2+}$, $Ba^{2+}$. In hydrocarbon producing systems, typical examples of scale include carbonate, sulfate, and sulfide salts, such as salts of ions such as $Fe^{2+}$, and ions of group I and group II metals such $Ca^{2+}$, $Mg^{2+}$, $Sr^{2+}$, $Ba^{2+}$. For example, scale can be $BaSO_4$, $SrSO_4$, $CaSO_4$, or $CaCO_3$.

The method can be a method of inhibiting scale formation downhole during any suitable downhole operation. The method can include inhibiting scale downhole or above the surface. In some embodiments, the cocrystals can be used in chemical environments that are unsuitable to other scale inhibitors, such as scale inhibitors in non-cocrystal form. For example, in some embodiments the cocrystals can be used effectively to inhibit scale in the presence of a viscous fluids for downhole operations including a gel or crosslinked gel and a crosslinker that contains a metal or transition metal such as at least one of chromium, aluminum, antimony, zirconium, titanium, calcium, boron, iron, silicon, copper, zinc, magnesium, and an ion thereof. While most scale inhibitors chelate or bind to the metal or transition metal of the crosslinker, the scale inhibitors of the present invention in cocrystal form can coexist in the presence of the crosslinker without or with less consumption through binding action to the metal or transition metal of the crosslinker, making the scale inhibitors of various embodiments more available for inhibition of scale than other non-cocrystalized scale inhibitors.

The placing of the composition in the subterranean formation or the contacting of the subterranean formation and the composition can occur while the subterranean formation is contacted with or has therein at least one of a gel, a crosslinked gel, and a crosslinker. The gel or crosslinked gel can be any gel or crosslinked gel, such as at least one of poly(acrylic acid), poly(acrylate), poly(vinyl acetate), poly (vinyl alcohol), poly(ethylene glycol), poly(vinyl pyrrolidone), polyacrylamide, poly (hydroxyethyl methacrylate), starch, tamarind, tragacanth, guar gum, gum ghatti, gum arabic, locust bean gum, acetan, alginate, chitosan, curdlan, a cyclosophoran, dextran, diutan, emulsan, a galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, welan, cellulose, carboxymethyl cellulose, hydroxyethyl cellulose, carboxymethyl hydroxyethyl cellulose, hydroxypropyl cellulose, methyl hydroxyl ethyl cellulose, guar, hydroxypropyl guar, carboxy methyl guar, and carboxymethyl hydroxylpropyl guar. The gel or crosslinked gel can be any suitable proportion of the composition. In some example, the gel or crosslinked gel can be about 0.001 wt % to about 99.999 wt % of the composition, or about 0.001 wt % to about 50 wt % of the composition, or about 0.001 wt % or less, or about 0.01 wt %, 0.5, 0.1, 1, 2, 3, 4, 5, 10, 15, 20, 30, 40, 50, 60, 70, 80, 85, 90, 95, 96, 97, 98, 99, 99.5, 99.9, 99.99, or about 99.999 wt % or more of the composition.

The crosslinker can be any suitable crosslinker for crosslinking a gel, such as a crosslinker including at least one of chromium, aluminum, antimony, zirconium, titanium, calcium, boron, iron, silicon, copper, zinc, magnesium, and an ion thereof. In some embodiments, the crosslinker is at least one of boric acid, borax, ferric chloride, disodium octaborate tetrahydrate, sodium diborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. The crosslinking compound can form any suitable weight of the composition. For example, the crosslinking compound can be about 0.000,001 wt % to about 50 wt % of the composition, or about 0.001 wt % to about 25 wt % of the composition, or about 0.000,001 wt % or less, or about 0.000,005 wt %, 0.000,01, 0.000,05, 0.000,1, 0.000,5, 0.001, 0.005, 0.01, 0.05, 0.1, 0.5, 1, 1.5, 2, 3, 4, 5, 6, 7, 8, 9, 10, 12, 14, 16, 18, 20, 25, 30, 40, or about 50 wt % or more of the composition.

In methods of the present invention, the cocrystals can be effective to at least partially inhibit scale downhole, such as by direct action of the cocrystal, or such as by action of the scale inhibitor in a dissociated form from the cocrystal. The scale-inhibiting effect can include binding or chelating with a scale-forming ion, such as at least one of $Fe^{2+}$, $Ca^{2+}$, $Mg^{2+}$, $Sr^{2+}$, and $Ba^{2+}$. In some embodiments, the cocrystal itself has little to no scale-inhibiting action, and the scale-inhibiting action is substantially entirely caused by disassociated scale inhibitor. In some embodiments, the scale-inhibiting compound in the cocrystal is less reactive with a crosslinker or ion therefrom in the surrounding solution than the disassociated scale-inhibiting compound. In some embodiments, although the disassociated scale-inhibiting compound is just as reactive with a metal or transition metal from a crosslinker as a scale-inhibiting compound that did not originate from a crosslinker, by keeping the scale-inhibiting compound in a cocrystal state for an extended period while transporting to the downhole location and up until the disassociation, the consumption of the scale-inhibiting compound is reduced as compared to a scale-inhibiting compound in non cocrystal form. Thus, in various embodiments, the cocrystals can maintain a greater concentration of dissociated scale inhibitor in the surrounding solution over time in the presence of a crosslinker or ion therefrom than a corresponding scale inhibitor contacting the subterranean formation that did not originate from a cocrystal downhole. The cocrystals can delay delivery of the dissociated scale inhibitor as compared to a corresponding scale inhibitor placed in or contacting the subterranean formation that did not originate from a cocrystal downhole.

Cocrystals

Each of the cocrystals including a scale-inhibiting compound independently can be any suitable type of cocrystal having any suitable type of structure, such that the cocrystals can be used as described herein and have properties as described herein, e.g., such that the cocrystals can be used downhole to effectively inhibit scale. For example, the cocrystal can include a crystalline structure that has a unit cell including both the scale-inhibiting compound and the at least one secondary material. The cocrystal can have crystal structure wherein the scale-inhibiting compound and the secondary material interact via at least one of ionic interaction, ionic bonding, Van der Waals force, London dispersion force, dipole-dipole interaction, hydrogen bonding, metallic bond, pi-interaction, and cation-pi interaction. In some embodiments, the cocrystal can be at least one of a hydrate, a solvate, and a clathrate.

The cocrystals can include one type of crystals or the cocrystals can include multiple types of cocrystals. For example, the cocrystals can include some cocrystals including one particular scale-inhibiting compound, while other cocrystals can include a different scale-inhibiting compound. In some examples, some of the cocrystals have a scale inhibitor designed to target one type of scale-forming ion, while other cocrystals have a scale inhibitor designed to target another type of scale-forming ion. In some examples, some of the cocystals can be designed to release the scale inhibitor after a particular time passes or a particular event occurs, while other cocrystals can be designed to release the scale inhibitor after a different amount of time passes or after a different event occurs.

The cocrystal can have a crystal structure that is different from a crystal structure of a crystal of the scale-inhibiting compound alone. The cocrystal can have at least one property that is different than a corresponding property of a crystal of the scale-inhibiting compound alone. For example, the cocrystal can have at least one of a different density, melting point, solubility, rate of dissolution, reactivity, mechanical properties, volatility, hygroscopicity, water resistance, and a different toxicity than a crystal of the scale-inhibiting compound alone. The cocrystal can have a crystal structure that is different from a crystal structure of a crystal of the secondary material alone. The cocrystal can have at least one property that is different than a corresponding property of a crystal of the secondary material alone. For example, the cocrystal can have at least one of a different density, melting point, solubility, rate of dissolution, reactivity, mechanical properties, volatility, hygroscopicity, water resistance, and a different toxicity than a crystal of the scale-inhibiting compound alone.

Each of the cocrystals can independently have any suitable shape and size. For example, the cocrystal can be substantially spherical, or can be irregularly shaped. The cocrystals can be nanoparticles. The cocrystals can have an particle size of about 0.1 nm to about 10 mm, or about 1 nm to about 5 mm, or about 0.1 nm or less, or about 1 nm, 2 nm, 3 nm, 4 nm, 5 nm, 10 nm, 20 nm, 50 nm, 100 nm, 250 nm, 500 nm, 750 nm, 0.001 mm, 0.005 nm, 0.01 mm, 0.05 mm, 0.1 mm, 0.5 mm, 1 mm, 2 mm, 3 mm, 4 mm, 5 mm, or about 10 mm or more. A particle size of a spherical particle corresponds to the approximate diameter of the sphere. A non-spherical particle size corresponds to the largest dimension of the particle.

The cocrystals can be any suitable proportion of the composition. For example, the cocrystals can be about 0.000,000,1 wt % to about 99.999,999,9 wt % of the composition, or about 0.001 wt % to about 50 wt % of the composition, or about 0.000,000,1 wt % or the composition or less, or about 0.000,001 wt %, 0.000,01, 0.000,1, 0.001, 0.01, 0.1, 1, 2, 3, 4, 5, 10, 15, 20, 25, 30, 35, 40, 45, 50, 55, 60, 65, 70, 75, 80, 85, 90, 95, 96, 97, 98, 99, 99.9, 99.99, 99.999, 99.999,9, 99.999,99, 99.999,999 wt % or about 99.999,999,9 wt % or more of the composition.

The scale-inhibiting compound and the secondary material can have any suitable ratio in the cocrystal. For example, the scale-inhibiting compound and the secondary material can have a mole ratio in the cocrystal of about 1:0.01 to about 1:100 in the cocrystals, about 1:1 to about 1:10, about 1:1 or about 1:2, or about 1:0.01 or less, or about 1:0.1, 1:0.3, 1:0.5, 1:1, 1:2, 1:3, 1:4, 1:5, 1:6, 1:7, 1:8, 1:9, 1:10, 1:15, 1:20, 1:50, or about 1:100 or more in the cocrystals.

Scale-Inhibiting Compound

As used herein, the term "scale inhibitor" means any substance that inhibits or prevents the deposition of scale within a hydrocarbon producing system, such as by binding or chelating with ions that form scale to prevent or reduce their tendency to form salts that are considered scale.

The scale-inhibiting compound can be any suitable scale inhibitor. The scale-inhibiting compound can be sufficient to inhibit scale under downhole conditions at least one of in the cocrystal and in a dissociated state from the cocrystal (e.g. in solution). The scale inhibitor can be at least one of a phosphonate, phosphate, sulfonate, acrylate, and a carboxylate. The scale inhibitor can include one of more anionic moieties that allow the scale inhibitor to bind or chelate to scale-forming ions. For example, the scale inhibitor can be a carboxylate- or carboxylic acid containing compound, such as a polycarboxylic acid, an acrylate or a polyacrylate, or a maleate or a polymaleate. The scale inhibitor can be a phosphate, a phosphate ester, or a phosphonate, such as a polyphosphonate. For example, scale inhibitors can be organic compounds including at least one of phosphonate (—P(O)(OZ)OZ), sulfonate (e.g., —S(O)(O)OZ), and carboxylate (e.g., —C(O)OZ) moieties, wherein Z is —H or Cl$^+$ (e.g., when Z is —H then O has a covalent O—H bond, when Z is Cl$^+$ the bond is ionic and is —O$^-$Cl$^+$). In various embodiments, Cl$^+$ is any suitable positively charged counterion, such as any suitable positively charged counterion. For example, the counterion can sodium (Na$^+$), potassium (K$^+$), lithium (Li$^+$), hydrogen (H$^+$), zinc (Zn$^+$), or ammonium (NH$_4^+$), and can be any Group I or metal. In some embodiments, the counterion can have a positive charge greater than +1, which can in some embodiments complex to multiple ionized groups, such as Ca$^{2+}$, Mg$^{2+}$, Zn$^{2+}$ or Al$^{3+}$, and can be any Group II metal. In some embodiments, the scale inhibitor is a polymer including at least one of a phosphonate, sulfonate, and a carboxylate moiety, such as a polymer formed from a compound having a polymerizable group (e.g. an alkenyl or vinyl group) bound directly or via a linking group to a phosphonate, sulfonate, or a carboxylate moiety. In some embodiments, the polymer is formed from an alkenyl-containing anhydride that is hydrolyzed to form the carboxylate moiety.

In some embodiments, a polymeric scale inhibitor can be formed from a compound having one of the following structures, wherein the polymer can include the compound polymerized substantially on its own, or polymerized in combination with one or more other compounds (e.g., a copolymer):

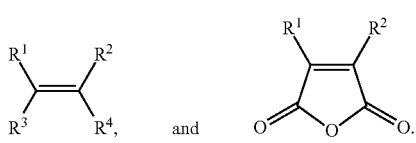

The variable $R^1$ is —P(O)(OZ)OZ, —S(O)(O)OZ, —C(O)OZ, or a $C_1$-$C_{20}$ hydrocarbyl or a $C_4$-$C_{20}$ aryl or $C_1$-$C_{20}$ heteroaryl group, wherein the hydrocarbyl or aryl group can be substituted or unsubstituted, wherein the hydrocarbyl or aryl group is substituted with at least one P(O)(OZ)OZ, —S(O)(O)OZ, —C(O)OZ, wherein the hydrocarbyl group is optionally interrupted with 1, 2, or 3 heteroatoms such as O, S, or N which can each independently be substituted or unsubstituted, wherein $Cl^+$ is a suitable counterion such as any group I or group II metal, such as sodium ($Na^+$), potassium ($K^+$), lithium ($Li^+$), hydrogen ($H^+$), zinc ($Zn^+$), ammonium ($NH_4^+$), $Ca^{2+}$, $MG^{2+}$, $Zn^{2+}$ or $Al^{3+}$. The variables $R^2$, $R^3$, $R^4$ are —H or a $C_1$-$C_{20}$ hydrocarbyl or a $C_4$-$C_{20}$ aryl or $C_1$-$C_{20}$ heteroaryl group, wherein the hydrocarbyl or aryl group can be substituted or unsubstituted. The polymer can terminate in any suitable way, such as with an —H, a P(O)(OZ)OZ, —S(O)(O)OZ, —C(O)OZ, or with a $C_1$-$C_{10}$ substituted or unsubstituted hydrocarbyl group. Thus, in some examples, a polymeric scale inhibitor can include at least one of the following repeating units:

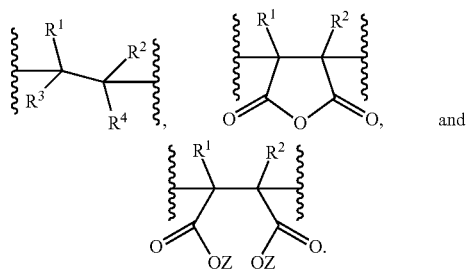

In various embodiments, the scale inhibitor can be a polymer formed from at least one of or any suitable salt of acrylic acid, aspartic acid, fumaric acid, methacrylic acid, hydroxypropyl acrylic acid, vinyl phosphonic acid, vinylidene diphosphonic acid, maleic anhydride, itaconic acid, crotonic acid, maleic acid, mesoconic acid, citraconic acid, styrene sulfonic acid, allyl sulfonic acid, methallyl sulfonic acid, vinyl sulfonic acid, and a salt thereof. In various embodiments, the scale inhibitor can be a polymer formed from a diallyl ammonium salt, such as diallyl di($C_1$-$C_{10}$alkyl) ammonium halide, such as diallyl dimethyl ammonium chloride, and at least one polymerizable compound described herein including a sulfonate, phosphonate, or carboxylate moiety.

In some embodiments, the scale inhibitor is hexamethylenediamine tetrakis(methylene phosphonic acid), poly(aspartic acid) (PASP), diethylenetriamine tetra(methylene phosphonic acid), diethylenetriamine pentakis(methylene phosphonic acid), 2-phosphonobutane-1,2,4-tricarboxylic acid, polyacrylic acid (PAA), phosphinocarboxylic acid (PPCA), diglycolamine phosphonate (DGA phosphonate), 1-hydroxyethylidene-1,1-diphosphonate (HEDP phosphonate), bisaminoethylether phosphonate (BAEE phosphonate), 2-acrylamido-2-methyl-1-propanesulphonic acid (AMPS), acrylic acid-hydroxypropyl acrylate copolymer, hydrolyzed poly(maleic anhydride) (HPMA), maleic anhydride-acrylic acid copolymer (e.g., hydrolyzed, MA/AA), or acrylic acid-2-acrylamino-2-methylpropane sulfonic acid copolymer (AA/AMPS).

Secondary Material

The secondary material in the cocrystal can be any suitable secondary material, such that the cocrystal can be used as described herein. The secondary material can be a compound or an elemental material (e.g., including only one type of atom). The secondary material is not the same material as the scale-inhibiting compound. There can be one secondary material in the cocrystal, or more than one secondary material. The secondary material can be a substantially non-scale-inhibiting compound or an inert material. The secondary material can be a scale-inhibiting compound having less scale-inhibiting ability than the scale-inhibiting compound. The secondary material can be a scale-inhibiting compound having about the same amount of scale-inhibiting activity or more scale-inhibiting activity as compared to the scale-inhibiting compound.

In some embodiments, the secondary material is a scale-inhibiting compound, such as any scale-inhibiting compound described herein. For example, the secondary compound can be a compound including at least one of a phosphonate, sulfonate, and a carboxylate group, e.g., at least one of a —P(O)(OZ)OZ, —S(O)(O)OZ, and a —C(O)OZ group, where Z is independently selected from —H and $Cl^+$, wherein $Cl^+$ is a counterion as defined herein. In some embodiments, the secondary material is hexamethylenediamine tetrakis(methylene phosphonic acid), poly(aspartic acid) (PASP), diethylenetriamine tetra(methylene phosphonic acid), diethylenetriamine pentakis(methylene phosphonic acid), 2-phosphonobutane-1,2,4-tricarboxylic acid, polyacrylic acid (PAA), phosphinocarboxylic acid (PPCA), diglycolamine phosphonate (DGA phosphonate), 1-hydroxyethylidene-1,1-diphosphonate (HEDP phosphonate), bisaminoethylether phosphonate (BAEE phosphonate), 2-acrylamido-2-methyl-1-propanesulphonic acid (AMPS), acrylic acid-hydroxypropyl acrylate copolymer, hydrolyzed poly(maleic anhydride) (HPMA), maleic anhydride-acrylic acid copolymer (e.g., hydrolyzed, MA/AA), or acrylic acid-2-acrylamino-2-methylpropane sulfonic acid copolymer (AA/AMPS).

In some embodiments, the secondary material is acetylsalicylic acid, adipic acid, 4-aminobenzoic acid, 4-aminobenzamide, anthranillic acid, arabinose, arginine (e.g., L-arginine), ascorbic acid (e.g., L-ascorbic acid), aspartic acid (e.g., L-aspartic acid), benzamide, benzenesulfonic acid, benzoic acid, boric acid, calcium chloride, camphoric acid (e.g., (+) camphoric acid), cholic acid, citric acid, cyclamic acid, erythritol, fructose, fumaric acid, gentisic acid, glucose, glucoronic acid (e.g., D-glucuronic acid), gluconic acid (e.g., D-gluconic acid), glutamic acid (e.g., L-glutamic acid), glutaric acid, glycine, glycolamide, glycolic acid, hippuric acid, 4-hydroxybenzamide, 4-hydroxybenzoic acid, 1-hydroxy-2-naphthoic acid, imidazole, isonicotinamide, ketoglutaric acid, lactamide, lactic acid, lactose, laurylsulfonic acid, lysine (e.g., L-lysine), magnesium chloride, maleic acid, malic acid (e.g., L-malic acid), malonic acid, maltose, mandelic acid, mannitol, mannose, methyl-4-hydroxybenzoic acid, neotame, nicotinamide, nicotinic acid, orcinol, oxalic acid, 2-oxoglutaric acid, palmoic acid, pimelic acid, piperazine, proline (e.g., L-proline), pyroglutamic acid (e.g., L-pyroglutamic acid), resourcinol, saccharin, salicylic acid, sebacic acid, sorbic acid, sorbitol, stearic acid, suberic acid, succinic acid, sucrose, tartaric acid, threonine (e.g., L-threonine), thromethamine, cinnamic acid (e.g., trans-cinnamic acid), trimesic acid, tyrosine ethyl ester, tyrosine (e.g., L-tyrosine), urea, 2,4,6-trinitrotoluene (TNT), octahydro-1,3,5,7-tetranitro-1,3,5,7-tetrazocine (HMX), 2,4,6,8,10,12-hexanitro-2,4,6,8,10,12-hexaazaisowurtzitane (HNIW or CL-20), 1,3,5-trinitroperhydro-1,3,5-triazine (RDX), nitroglycerin, nitrocellulose, [3-nitrooxy-2,2-bis(nitrooxymethyl)propyl]nitrate or pentaerythritol tetranitrate (PETN), benzotrifuroxan (BTF), N-methyl-2-pyrrolidone, 2,4-dinitro-2,4-diazapentane, 1,2-phenylenediamine, 2-bromoaniline, 3,4-diaminotoluene, 4-fluoroaniline, thieno[3,2-b]thiophene, 2-pyrrolidone, 2-picoline-N-oxide, 4-picoline-N-oxide, naphthalene, 1-bromonaphthalene, 9-bromonaphthalene, anthracene, 9-bromoanthracene, phenanthrene, perylene, tetrathiafulvalene, phenothiazine, dibenzothiophene, 4,6-dimethyldibenzothiophene, 1,2-phenylenediamine, 1,4-dimethyoxybenzene, 4-aminobenzoic acid, 1,4-piperazinedicarboxaldehyde, anthranilic acid, pyrene, caprolactam, $H_2O$, $CO_2$, dimethylformamide (DMF), 1,4-dioxane, γ-butyrolactone, or hexamethylphosphoramide.

In some embodiments, the secondary material can be formed from a reaction of an acid and a base. The acid and the base can be reacted in any suitable way to produce the secondary material. The acid and base can be any suitable acid and base, such that a secondary material is formed that generates a cocrystal with the scale-inhibiting material that can be used as described herein. For example, the base can be a base such as ammonia, L-arginine, benethamine, benzathine, betaine, calcium hydroxide, choline, decanal, diethanolamine, diethylamine, 2-(diethylamino)ethanol, 2-aminoethanol, ethylenediamine, N-methylglucamine, hydrabamine, 1H-imidazole, lysine, a hydroxide salt (e.g., magnesium hydroxide, sodium hydroxide, potassium hydroxide, or zinc hydroxide), morpholine, 4-(2-hydroxyethyl)morpholine, piperazine, pyrrolidine, 1-(2-hydroxyethyl)pyrrolidine, triethanolamine, or tromethamine. For example, the acid can be an acid such as (+)-L-tartaric acid, 1,2,2-trimethyl-1,3-cyclopentanedicarboxylic acid, 10-undecylenic acid, 1-hydroxy-2-naphthoic acid, (+)-camphor-10-sulfonic acid, 2,5-dihydroxybenzoic acid, 2-furancarboxylic acid, 2-mercaptobenzoic acid, 3-cyclopentylpropionic acid, 3-phenylpropionic acid, 4-aminosalicylic acid, 4-hydroxybenzoic acid, acetic acid, adipic acid, alpha-hydroxypropionic acid, benzenesulfonic acid, benzoic acid, carbonic acid, cholic acid, citric acid, (−)-D-tartaric acid, (+)-D-camphoric acid, (+)-D-malic acid, (+)-L-malic acid, 2,2-dichloroacetic acid, DL-10-camphorsulfonic acid, DL-glutamic acid, DL-malic acid, DL-tartaric acid, dodecylsulfuric acid, ethanesulfonic acid, ethylenediaminetetraacetic acid, ethylsulfuric acid, fumaric acid, galactaric acid, gallic acid, gluconic acid, glutamic acid, glycolic acid, hippuric acid, hydroiodic acid, hydrobromic acid, hydrochloric acid, (−)-L-apple acid, (+)-L-lactic acid, (+)-L-tartaric acid, D,L-lactic acid, lactobionic acid, L-aspartic acid, lauric acid, L-glutamic acid, maleic acid, (−)-L-malic acid, malonic acid, D,L-mandelic acid, methanesulfonic acid, naphthalene-2-sulfonic acid, n-butyric acid, n-decanoic acid, n-hexanoic acid, nitric acid, n-tetradecanoic acid, octanoic acid, oleic acid, orotic acid, orthoboric acid, oxalic acid, 4-acetamidobenzoic acid, palmitic acid, pamoic acid, phosphoric acid, picric acid, pivalic acid, propionic acid, p-toluenesulfonic acid, pyrophosphoric acid, salicylic acid, stearic acid, succinic acid, sulfosalicylic acid, sulfuric acid, terephthalic acid, thiocyanic acid, valeric acid, or valproic acid.

In some embodiments, the secondary material can be at least one of (−)-carvyl propionate, (−)-caryophyllene oxide, (−)-dihydrocarvyl acetate, (−)-limonene, (−)-menthyl lactate, (−)-myrtenal, (+)-camphor, (+)-neomenthol, (+/−)-citronellic acid, (1S)-(−)-alpha-pinene, (2R,3S)-tartaric acid, (2S,7S)-(−)-cystine, (E)-2-octenol, (E,E)-2,4-octadienal, (E,Z)-2,6-nonadienal, (e,z)-2,6-nonadienyl acetate, (1R)-2,6,6-trimethylbicyclo[3,1,1]hept-2-ene, (1S)-6,6-dimethyl-2-methylenebicyclo[3,1,1]heptane, (S)-(−)-cysteine, (S)-(−)-histidine, (S)-(−)-phenylalanine, (S)-(−)-tryptophan, (S)-(−)-tyrosine, (S)-(+)-arginine, (S)-(+)-lysine, (Z)-3-hexenal, 1R-(−)-camphorsulfonic acid, 1-(2-furyl)-1,3-butanedione, 1-(2-furyl)-2-propanone, 1-(3-pyridinyl)ethanone, 1,1'-azobisformamide, 1,1-diethoxyethane, 1,1-dimethoxy-2-phenylpropane, 1,1-dimethoxy-3,7-dimethyl-7-octanol, 1,2,2-trimethyl-1,3-cyclopentanedicarboxylic acid, 1,2,3-propanetricarboxylic acid, 2-hydroxy-, disodium salt, 1,2-benzisothiazol-3(2H)-one 1,1-dioxide, ammonium salt, 1,2-benzisothiazol-3(2H)-one 1,1-dioxide, calcium salt, 1,2-benzisothiazolin-3-one 1,1-dioxide, potassium salt, 1,2-butanedithiol, 1,2-ethanediamine, N,N'-bis(phenylmethyl)-, 1,3,4,6,7,8-hexahydro-4,6,6,7,8,8-hexamethyl cyclopenta[g][2]benzopyran, 1,3,5-trithiane, 2,2,4,4,6,6-hexamethyl-, 1,3,5-undecatriene, 1,3-butanediol, 1,3-butanedithiol, 1,3-dihydroxy-5-methylbenzene, 1,3-dimercaptopropane, 1,4-dithiane, 1,4-dithiane-2,5-diol, 1,5-naphthalenedisulfonic acid disodium salt, 1,6-hexanedithiol, 10-camphorsulfonic acid, 10-undecylenic acid, 1-benzyloxy-2-methoxy-4-propenyl benzene, 1-butanol, 2-methyl-, acetate, 1-hexanethiol, 2-ethyl-, 1-hexen-3-ol, 1H-pyrrole, 1-(2-furanylmethyl)-, 1-hydroxy-2-butanone, 1-hydroxy-2-methoxy-4-ethyl benzene, 1-hydroxy-2-naphthoic acid, 1-hydroxyethylidene-1, 1-diphosphonic acid, 1-methoxy-4-methylbenzene, 1-methoxy-4-propyl benzene, 1-methyl-4-(1-methylethyl)-1,4-cyclohexadiene, 1-methyl-4-(1-methylethyl)-1,4-cyclohexadiene en-ethylene diamine, 1-methyl-4-(1-methylethylidene)cyclohexene, 1-methylnaphthalene, 1-octen-3-ol, 1-octen-3-one, 1-octen-3-yl acetate, 1-octen-3-yl butyrate, 1-penten-3-ol, 1-penten-3-one, 1-phenyl-1,2-propanedione, 1-phenyl-1-propanol, 1-phenyl-2-pentanol, 1-phenylethyl propionate, 1-pyrazinylethanone, 2-(2-ethoxyethoxy)ethanol, 2-(3-phenylpropyl)pyridine, 2-(methyldithio)-isobutyraldehyde, 2,2,6-trimethylcyclohexanone, 2,2-dibromo-3-nitrilopropionamide, 2,2'-oxybisethanol, 2,3,4-trimethyl-3-pentanol, 2,3,6-trimethyl-phenol, 2,3-butanedithiol, 2,3-diethyl-5-methyl-pyrazine, 2,3-diethyl-pyrazine, 2,3-dimethyl-pyrazine, 2,3-hexanedione, 2,3- naphthalenediol, 2,3-pentanedione, 2,4,5-trimethylthiazole, 2,4,6-tribromophenol, 2,4,6-trinitro-1,3-dimethyl-5-tert-butylbenzene, 2,4-decadien-1-ol, 2,4-dihydroxybenzoic acid, 2,4-dimethyl-3-cyclohexene-1-carboxaldehyde, 2',4'-dimethylacetophenone, 2,4-dimethylanisole, 2,4-dimethylbenzaldehyde, 2,4-dimethylphenol, 2,4-hexadien-1-ol, 2,4-hexadienal, 2,4-hexadienoic acid, methyl ester, (E,E)-, 2,4-hexadienoic acid, potassium salt, (E,E)-, 2,4-nonadien-1-ol, 2,4-octadien-1-ol, 2,5-diethyltetrahydrofuran, 2,5-dihydro-4,5-dimethyl-2-(2-methyl propyl)thiazole, 2,5-dihydroxy, 2,5-dimethyl-1,4-dithiane, 2,5-dihydroxybenzoic acid, 2,5-dihydroxybenzoic acid, gentisic acid, 2,5-dimethyl pyrrole, 2,5-dimethyl-3-furanthiol, 2,5-dimethyl-4-methoxy-3(2H)-furanone, 2,5-dimethylphenol, 2,5-dimethylpyrazine, 2,6,10-trimethyl-2,6,10-pentadecatrien-14-one, 2,6-dimethoxyphenol, 2,6-dimethyl-4-heptanol, 2,6-dimethyl-4-heptanone, 2,6-dimethyl-5-hepten-1-al, 2,6-dimethylphenol, 2,6-dimethylpyrazine, 2,6-dimethylpyridine, 2,6-dimethylthiophenol, 2,6-di-tert-butyl-p-cresol, 2,6-octadien-1-ol, 3,7-dimethyl-, propanoate, (Z)-, 2-acetoxy-3-butanone, 2-acetyl-1-methylpyrrole, 2-acetyl-2-thiazoline, 2-acetyl-3-ethyl pyrazine, 2-acetyl-5-methyl furan, 2-acetylfuran, 2-acetylpyridine, 2-acetylpyrrole 2-acetylthiazole, 2-amino-2-(hydroxymethyl)-1,3-propanediol, 2-aminopropionic acid, 2-butanone, 1-(methylthio)-, 2-butanone, 3-hydroxy-, (+−)-, 2-butenal, 2-methyl-, (E)-, 2-butoxy ethanol, 2-chloro-1-propanol, 2-dehydrolinalool, 2-ethoxyethanol, 2-ethoxythiazole, 2-ethyl pyrazine, 2-ethyl-1-hexanol, 2-ethyl-3,5(6)-dimethylpyrazine, 2-ethyl-3,5-dimethylpyrazine, 2-ethyl-3-hydroxy-4-pyrone, 2-ethyl-3-methyl-pyrazine, 2-ethyl-4,5-dimethyl oxazole, 2-ethyl-4-methyl thiazole, 2-ethyl-5-methyl pyrazine, 2-ethylbutyl acetate, 2-ethylbutyric acid, 2-ethylbutyrinc acid, 2-ethylfenchol, 2-ethylfuran, 2-ethylhexanoic acid, 2-furancarboxylic acid, 2-furancarboxylic acid, propyl ester, 2-heptenoic acid, 2-hexanoylfuran, 2-hexen-1-yl acetate, 2-hexenal, 2H-pyrrole, 3,4-dihydro-, 2'-hydroxyacetophenone, 2-hydroxyethanesulfonate, 2-isobutyl-3-methoxypyrazine, 2-isobutyl-3-methyl-pyrazine, 2-isobutylthiazole, 2-isopropyl-4-methyl thiazole, 2-isopropylphenol, 2-isopropylpyrazine, 2-ketobutyric acid, 2-ketoglutaric acid, 2-ketovaline, 2-mercaptobenzoic acid, 2-mercaptopropionic acid, 2-methoxy-3-sec-butyl-pyrazine, 2-methoxy-4-methylphenol, 2-methoxy-4-propylphenol, 2-methoxycinnamaldehyde, 2-methoxynaphthalene, 2-methoxypyrazine, 2-methoxystyrene, 2-methyl-1,3-dithiolane, 2-methyl-1-butanethiol, 2-methyl-1-phenyl-2-propanol, 2-methyl-1-propanol, 2-methyl-2-pentenal, 2-methyl-2-pentenoic acid, 2-methyl-3-(2-furyl)acrolein, 2-methyl-3-(dimercaptomethyl)-furan, 2-methyl-3-buten-2-ol, 2-methyl-3-furanethiol, 2-methyl-4-pentenoic acid, 2-methyl-4-propyl-1,3-oxathiane, 2-methyl-5-(1-methylethenyl)-2-cyclohexene-1-one, 2-methyl-5-(methylthio)-furan, 2-methyl-5-ethylpyridine, 2-methylbutanoic acid, 2-methylbutyl 2-methylbutanoate, 2-methylbutyl isovalerate, 2-methylbutyraldehyde, 2-methylcyclohexanone, 2-methylheptanoic acid, 2-methylhexanoic acid, 2-methylpyrazine, 2-methyltetrahydrofuran-3-one, 2-methyltetrahydrothiophen-3-one, 2-methylthio-3(6)-methyl-pyrazine, 2-methylthiopyrazine, 2-naphthalenesulfonic acid sodium salt, 2-naphthalenethiol, 2-n-propylphenol, 2-octanol, 2-octen-4-one, 2-pentanone, 2-pentenal, 2-pentyl furan, 2-pentylpyridine, 2-phenyl-1-propanol, 2-phenyl-2-butenal, 2-phenyl-3-(2-furyl)-propenal, 2-phenylpropyl butyrate, 2-phenylpropyl isobutyrate, 2-propanol, 2-propenoic acid, 3-phenyl-, 2-methylpropyl ester, 2-propenoic acid, 3-phenyl-, 3-phenylpropyl ester, 2-propenoic acid, 3-phenyl-, cyclohexyl ester, 2-propenoic acid, 3-phenyl-, methyl ester, (E)-, 2-propionylpyrrole, 2-propionylthiazole, 2-propylpyrazine, 2-sec-butyl thiazole, 3(2H)-furanone, 2,5-dimethyl-, 3-(5-methyl-2-furyl)butanal, 3-(methylthio)butanal, 3-(methylthio)propanol, 3-(methylthio)propionaldehyde, 3,3,5-trimethyl-1-cyclohexanol, 3,3-dimethylacrylic acid, 3,3'-thiodipropionic acid, 3,4-dihydrocoumarin, 3,4-dimethyl-1,2-cyclopentanedione, 3,4-hexanedione, 3,4-xylenol, 3,5,5-trimethylhexanal, 3,5,5-trimethylhexanol, 3,5,9-undecatrien-2-one, 6,10-dimethyl-, 3,5-dihydroxyacetophenone, 3,5-di-tert-butyl-4-hydroxybenzyl alcohol, 3,7,7-trimethyl bicyclohep-3-ene, 3,7-dimethyl-1,3,6-octatriene, 3,7-dimethyl-1,6-octadien-3-yl benzoate, 3,7-dimethyl-1,6-octadien-3-yl butyrate, 3,7-dimethyl-1,6-octadien-3-yl isobutyrate, 3,7-dimethyl-1,6-octadien-3-ylpropanoate, 3,7-dimethyl-1-octanol, 3,7-dimethyl-3-octanol, 3-acetyl-2,5-dimethylthiophene, 3-acetyl-2-5dimethylfuran, 3-acetyl-6-methyl-2,4-pyrandione, 3-buten-2-one, 3-methyl-4-phenyl-, 3-butyl-1 (3H)-isobenzofuranone, 3-cyclopentylpropionic acid, 3-ethyl pyridine, 3-ethyl-2-hydroxy-2-cyclopenten-1-one, 3-heptanol, 3-hepten-2-one, 3-hexanol, 3-hexanone, 3-hexen-1-ol, acetate, (Z)-, 3-hexenal, 3-hexenyl 3-methylbutanoate, 3-hydroxy-4,5-dimethyl-2(5H)-furanone, 3-mercapto-2-butanol, 3-mercapto-2-pentanone, 3-methoxy-p-cymene, 3-methyl-1,2-cyclohexanedione, 3-methyl-1,2-cyclopentanedione, 3-methyl-1-pentanol, 3-methyl-2-butanethiol, 3-methyl-2-butanol, 3-methyl-2-buten-1-ol, 3-methyl-2-butenal, 3-methyl-2-cyclohexen-1-one, 3-methyl-2-cyclopenten-1-one, 3-methyl-2-cyclopentene-2-ol-one, 3-methylbutanoic acid, 3-methylbutanoic acid butyl ester, 3-methylbutyl phenylacetate, 3-methylcyclohexanone, 3-methylthio-1-hexanol, 3-nonen-2-one, 3-octanol, 3-octen-2-one, 3-octyl acetate, 3-penten-2-one, 3-phenyl-1-propanol, 3-phenyloxiranecarboxylic acid ethyl ester, 3-phenylprop-2-enyl cinnamate, 3-phenylpropionaldehyde, 3-phenylpropionic acid, 3-phenylpropyl acetate, 3-phenylpropyl formate, 3-phenylpropyl isobutyrate, 3-phenylpropyl propanoate, 3-propylidene phthalide, 4-(2,6,6-trimethyl cyclohexa-1,3-dienyl)but-2-en-4-one, 4-(2,6,6-trimethyl-1-cyclohexen-1-yl)-3-buten-2-one, 4-(2,6,6-trimethyl-2-cyclohexen-1-yl)-3-buten-2-one, 4-(2,6,6-trimethyl-2-cyclohexen-1-yl)butan-2-one, 4-(4-hydroxy-4-methyl pentyl)-3-cyclohexene-1-carboxaldehyde, 4-(4-hydroxyphenyl)-2-butanone, 4-(4-methoxyphenyl)-2-butanone, 4-(methylthio)butanol, 4,5-dimethyl thiazole, 4-acetamidobenzoic acid, 4-acetyl-6-t-butyl-1,1-dimethylindan, 4-allyl-2,6-dimethoxyphenol, 4-aminobenzoic acid, 4-aminosalicylic acid, 4-chloro-3-methylphenol, 4-ethoxybenzaldehyde, 4-ethoxyphenol, 4-ethylbenzaldehyde, 4-ethylphenol, 4-heptanolide, 4-hexanolide, 4-hexen-3-one, 4-hexylresorcinol, 4-hydroxybenzoic acid, 4'-methoxyacetophenone, 4-methoxyphenylacetone, 4-methyl-1,1'-biphenyl, 4-methyl-2,3-pentanedione, 4-methyl-2-oxopentanoate, 4-methyl-2-pentenal, 4-methyl-2-pentyl-1,3-dioxolane, 4-methyl-5-thiazoleethanol, 4-methyl-5-thiazolylethyl acetate, 4-methyl-5-vinylthiazole, 4-methyl-alpha-methylstyrene, 4-methylcyclohexanone, 4-methylnonanoic acid, 4-methyloctanoic acid, 4-methylquinoline, 4-methyl-thiazole, 4-methylthio-2-butanone, 4-methylthio-4-methyl-2-pentanone, 4'-nitroacetanilide, 4-oxoisophorone, 4-phenyl-2-butanol, 4-phenyl-2-butyl acetate, 4-propylphenol, 4-tert-octylphenol, 4-vinylguaiacol, 5' IMP, 5-(cis-3-hexenyl) dihydro-5-methyl-2(3H)furanone, 5,6,7,8-tetrahydroquinoxaline, 5,6-dimethyl-8-isopropenylbicyclo[4,4,0]dec-1-en-3-one, 5,7-dihydro-2-methyl thieno(3,4-d)pyrimidine, 5-acetyl-2,4-dimethylthiazole, 5-ethyl-3-hydroxy-4-methyl-2(5H)-furanone malic acid, 5-ethyl-4-hydroxy-2-methyl-3[2H] furanone, 5-formyl-2-furansulfonic acid, sodium salt, 5-hydroxy-4-octanone, 5-hydroxy-6-methyl-3,4-pyridinedimethanol, 5-isopropyl-2-methyl-phenol, 5-methyl hexanoic acid, 5-methyl-2-thiophenecarboxaldehyde, 5-methyl-3-hexen-2-one, 5-methyl-3H-furan-2-one, 5-methyl-6,7-dihydro-5H-cyclopenta(b)pyrazine, 5-methylfurfural, 5-methylquinoxaline, 5-n-butyl-delta-valerolactone, 5-octanolide, 6,10-dimethyl-9-undecen-2-one, 6-amyl-alpha-pyrone, 6-methyl-3,5-heptadiene-2-one, 6-methyl-5-hepten-2-ol, 6-methyl-5-hepten-2-one, 6-methyl-alpha-ionone, 6-methylcoumarin, 6-methylquinoline, 6-octen-1-ol, 3,7-dimethyl-, (R)-, 6-octen-1-ol, 3,7-dimethyl-, (S)-, 6-octen-1-ol, 3,7-dimethyl-, formate, 6-octenal, 3,7-dimethyl-, (R)-, 7-methyl-3-methylene-1,6-octadiene, 8,8-diethoxy-2,6-dimethyl-2-octanol, 8-mercapto-p-menthan-3-one, 8-p-menthen-1-ol, acetaldehyde, acetaldehyde ethyl cis-3-hexenyl acetal, acetaldehyde phenethyl propyl acetal, acetic acid, acetic anhydride, acetoacetic acid isoamyl ester, acetoin, acetone, acetone propylene glycol acetal, acetophenone, acetyl isoeugenol, acetyl isovaleryl, acetyl tributyl citrate, acetyl valeryl, acetylacetaldehyde dimethyl acetal, aconitic acid, adipic acid, alginic acid, allyl 2-ethylbutyrate, allyl 2-furoate, allyl 3-methylbutyrate, allyl alpha-ionone, allyl anthranilate, allyl cinnamate, allyl crotonate, allyl cyclohexylacetate, allyl cyclohexylbutyrate, allyl cyclohexylpropionate, allyl hexanoate, allyl isothiocyanate, allyl mercaptan, allyl phenoxyacetate, allyl phenylacetate, allyl propionate, allyl sorbate, allyl thiopropionate, allyl tiglate, allylacetic acid, alpha, 4-dimethylbenzylalcohol, alpha,alpha-dimethyl phenethyl formate, alpha,alpha-dimethylphenethyl butyrate, alpha,beta-santalol, alpha-amyl cinnamaldehyde dimethyl acetal, alpha-amylcinnamyl alcohol, alpha-damascone, alpha-D-xylose, alpha-fenchyl acetate, alpha-furfuryl pentanoate, alpha-hydroxypropionic acid, alpha-ionol, alpha-isomethyl ionone, alpha-L-rhamnose, alpha-methyl benzyl formate, alpha-methylanisalacetone, alpha-methylbenzyl alcohol, alpha-methylcinnamaldehyde, alpha-methyl-p isopropylphenylpropanaldehyde, alpha-n-amyl-beta-phenyl acryl isovalerate, alpha-n-amyl-beta-phenylacryl acetate, alpha-phellandrene, alpha-piperitone, alpha-terpinene, alpha-terpineol, alpha-thioglycerol, aluminum, aluminum ammonium sulfate, aluminum chloride, aluminum chloride hexahydrate, aluminum hydroxide, aluminum nitrate nonahydrate, aluminum potassium sulfate, dodecahydrate, aluminum potassium sulfate, dodecahydrate, aluminum sulfate, aluminum sulfate, octadecahydrate, ammonium acetate, ammonium benzoate, ammonium bicarbonate, ammonium bisulfite, ammonium chloride, ammonium citrate, ammonium fluoride, ammonium hydroxide, ammonium nitrate, ammonium persulfate, ammonium phosphate monobasic, ammonium phosphate, dibasic, ammonium sulfate, ammonium sulfide, ammonium sulfite, amyl alcohol, amyl butyrate, amyl salicylate, amylcinnamaldehyde, amylcyclohexyl acetate, anethole, anisic acid, anisole, anisyl acetate, anisyl butyrate, anisyl formate, anisyl phenylacetate, anisyl propionate, arabinose, arginine, ascorbic acid, asparagine, aspartame, aspartic acid, aspirin, benzalacetone, benzaldehyde, benzaldehyde dimethylacetal, benzaldehyde glyceryl acetal, benzaldehyde propylene glycol acetal, benzene, benzene, (2-methoxyethyl)-, benzene, (butoxymethyl)-, benzene, 1,2-dimethoxy-4-(1-propenyl)-, benzene, 4-ethenyl-1,2-dimethoxy-, benzeneacetaldehyde, 4-methyl-, benzeneacetaldehyde, alpha-methyl-, benzeneacetic acid, 3-phenyl-2-propenyl ester, benzeneacetic acid, butyl ester, benzenepentanol, benzenepropanol, alpha, alpha-dimethyl-, benzenesulfonic acid, benzofuran-2-carboxaldehyde, benzoic acid, benzoic acid, 2-(methylamino)-, 2-methylpropyl ester, benzoin, benzophenone, benzothiazole, benzoyl peroxide, benzyl 3-methyl butanoate, benzyl acetate, benzyl alcohol, benzyl alcohol, alpha-methyl-, butyrate, benzyl benzoate, benzyl butyrate, benzyl cinnamate, benzyl dipropyl ketone, benzyl ether, benzyl ethyl ether, benzyl formate, benzyl isobutyl ketone, benzyl isobutyrate, benzyl mercaptan, benzyl methyl sulfide, benzyl phenylacetate, benzyl propionate, benzyl salicylate, benzyl tiglate, benzylacetoacetic acid, ethyl ester, benzylcarbinyl 2-methyl butyrate, benzylcarbinyl 3-phenyl propenoate, benzylcarbinyl alpha-toluate, benzylcarbinyl butyrate, benzylcarbinyl caproate, benzylcarbinyl formate, benzylcarbinyl isobutyrate, benzylcarbinyl propionate, benzylcarbinyl salicylate, benzylcarbinyl tiglate, beta-(2-furyl)acrolein, beta-alanine, beta-cyclodextrin, beta-D-fructopyranose, beta-homocyclocitral, betaine, beta-ionol, beta-phenylethylmethylethylcarbinol, bicyclo[4,1,0]hept-3-ene, 3,7,7-trimethyl-, (1S)-, biphenyl, bis(2-methyl-3-furyl)disulfide, bis(methylthio)methane, bisabolene, bois de rose oxide, borates, tetrasodium salts, borneol, bornyl acetate, bornyl formate, bornyl isovalerate, butane, 2-ethoxy-, butanethioic acid, S-methyl ester, butanoic acid, 2-propenyl ester, butanoic acid, 3-oxo-, 2-methylpropyl ester, butanoic acid, 3-oxo-, butyl ester, butanoic acid, 3-oxo-, phenylmethyl ester, butanoic acid, 3-phenyl-2-propenyl ester, butyl 2-methyl butyrate, butyl 2-methylpropanoate, butyl acetate, butyl anthranilate, butyl benzyl phthalate, butyl butyrate, butyl butyrolactate, butyl cinnamate, butyl cinnamic aldehyde, butyl formate, butyl levulinate, butyl mercaptan, butyl paraben, butyl sulfide, butylated hydroxyanisole, butylidene phthalide, butyraldehyde, caffeine, calcium acetate, calcium carbonate, calcium chloride, calcium chloride dihydrate, calcium citrate, calcium cyclamate, calcium gluconate, calcium glycerophosphate, calcium hydroxide, calcium hypophosphite, calcium iodide, calcium nitrate tetrahydrate, calcium oxide, calcium pantothenate, calcium peroxide, calcium phosphate monobasic, calcium phosphate tribasic, calcium phosphate, dibasic, calcium propionate, calcium pyrophosphate, calcium sorbate, calcium sulfate, camphene, campholenic aldehyde, camphoric acid, camphorsulfonic acid, capsaicin, carbonic acid, carvacryl ethyl ether, carveol, carvone, carvyl acetate, caryophyllene, cedran-8-yl acetate, chloroacetic acid, chloromethyl methyl ether, cholesterol, cholic acid, choline, choline bitartrate, choline chloride, cinnamaldehyde, cinnamic, acid, cinnamyl acetate, cinnamyl alcohol, cinnamyl benzoate, cinnamyl formate, cinnamyl isobutyrate, cinnamyl isovalerate, cinnamyl propionate, cis-2-hexen-1-ol, cis-3,7-dimethyl-2,6-octadien-1-yl 2-methyl propanoate, cis-3-hexen-1-ol, cis-3-hexenoic acid, cis-3-hexenyl anthranilate, cis-3-hexenyl benzoate, cis-3-hexenyl butyrate, cis-3-hexenyl caproate, cis-3-hexenyl cis-3-hexenoate, cis-3-hexenyl formate, cis-3-hexenyl isobutyrate, cis-3-hexenyl lactate, cis-3-hexenyl phenylacetate, cis-3-hexenyl propionate, cis-3-hexenyl pyruvate, cis-3-hexenyl tiglate, cis-3-hexenyl valerate, cis-3-octen-1-ol, cis-4-hepten-1-ol, cis-4-heptenal, cis-5-octen-1-ol, cis-6-nonenal, cis-6-nonenol, citral, citral diethyl acetal, citral dimethyl acetal, citral ethylene glycol acetal, citric acid, citronellal, citronellol, citronellyl acetate, citronellyl butyrate, citronellyl isobutyrate, citronellyl isovalerate, citronellyl phenylacetate, citronellyl propionate, citronellyl tiglate, citronellyl valerate, citronellyloxyacetaldehyde, citroxide, cocal, copper(I) iodide, copper(II) sulfate, coumarin, creatinine, cumene, cumic alcohol, cyclamic acid, cyclohexaamylose, cyclohexane, cyclohexanecarboxylic acid, cyclohexaneethanol, acetate, cyclohexanol, 5-methyl-2-(1-methylethyl)-, (1alpha,2beta,5alpha)-, cyclohexanol, 5-methyl-2-(1-methylethyl)-,(1alpha,2beta,5alpha)-, cyclohexene, 1-methyl-4-(1-methylethenyl)-, (+−)-, cyclohexyl acetate, cyclohexyl amine, cyclohexyl anthranilate, cyclohexyl butyrate, cyclohexyl formate, cyclohexyl isovalerate, cyclohexyl propionate, cyclohexylacetic acid, cyclopentanethiol, cyclopentanone, cymene, cysteine, D-(−)-fructose, D-(−)-tartaric acid, D(+)-10-camphorsulfonic acid, D-(+)-camphoric acid, D-(+)-glucono-1,5-lactone, D-(+)-lactose, D-(+)-maltose, D-(+)-mannose, D-(+)-proline, D-(+)-xylose, dabco, D-arabinose, decalactone, dehydro-beta-cyclocitral, delta-decalactone, delta-hexalactone, deoxycholic acid, dexpanthenol, D-fenchone, D-fructose 1,6-bisphosphate, D-fructose 1-phosphate, D-galactose, D-galacturonate, D-glucose, D-glucuronate, di(2-ethylhexyl) sulfosuccinic acid, sodium salt, diacetyl, diallyl disulfide, diallyl sulfide, dibenzyl disulfide, dibenzyl ketone, dibutyl phthalate, dichloroacetic acid, dicyclohexyl disulfide, diethanolamine, diethyl hydroxybutanedioate, diethyl L-(+)-tartrate, diethyl malonate, diethyl phthalate, diethyl succinate, diethylamine, diethylaminoethanol, diethylenetriamine, difurfuryldisulfide, difurfurylsulfide, dihydrocarveol, dihydrojasmone, dihydromyrcenol, dihydroxyacetophenone, dimethoxane, dimethyl anthranilate, dimethyl carbonate, dimethyl succinate, dimethyl sulfate, dimethyl sulfide, dimethyl terephthalate, dimethylacetal, dimethylamine, dimethylbenzylcarbinyl acetate, dimethyl-carbamodithioic acid, sodium salt, dimethyldicarbonate, dimethyldisulfide, dimethyltrisulfide, diphenylacetic acid, diphenyldisulfide, dipropyl disulfide, dipropyl ketone, D-isoascorbic acid, disodium, disodium cyanodithioimidocarbonate, disodium ethylenediaminetetraacetate dihydrate, disodium metasilicate, disodium pytophosphate, disodium succinate hexahydrate, DL-3-methylvaleric acid, DL-alanine, DL-alpha-tocopheryl acetate, DL-arginine, DL-aspartic acid, DL-cystine, DL-glutamic acid, D-limonene, DL-isoleucine, DL-lysine, DL-malic acid, DL-methionine, DL-monosodium glutamate, DL-phenylalanine, DL-proline, DL-tartaric acid, DL-tetrohydrofurfuryl propionate, DL-tyrosine, DL-valine, D-lysine hydrochloride, D-maltose monohydrate, d-mannitol, dodecyl sulfate, lithium salt, dodecylsulfonic acid, D-ribose, D-sorbitol 6-phosphate, D-tyrosine, dulcin, E-2-octenoic acid, EDTA, calcium derivative, disodium salt, eglantal, enanthoic acid, erythorbic acid monosodium salt, erythorbic acid sodium salt, erythritol, estragole, ethane-1,2-disulfonic acid, ethanesulfonic acid, ethanesulfonic acid, 2-hydroxy, ethanesulfonic acid, 2-hydroxy-, monosodium salt, ethanethioic acid, S-(2-furanylmethyl) ester, ethanethioic acid, S-methyl ester, ethanethioic acid, S-propyl ester, ethanol amine, ethoxyquin, ethyl (methylthio)acetate, ethyl (p-tolyloxy)acetate, ethyl 2-(methyldithio)propionate, ethyl 2-aminobenzoate, ethyl 2-mercaptopropionate, ethyl 2-methyl pentanoate, ethyl 2-methyl-3,4-pentadienoate, ethyl 2-methyl-4-pentenoate, ethyl 2-methylbutyrate, ethyl 2-trans-4-cis-decadienoate, ethyl 3(2-furyl)propanoate, ethyl 3-(2-furyl)propanoate, ethyl 3-(methylthio)propionate, ethyl 3-hexenoate, ethyl 3-hydroxybutyrate, ethyl 3-hydroxyhexanoate, ethyl 3-methyl pentanoate, ethyl 3-phenylpropionate, ethyl 4-hydroxybenzoate, ethyl 4-methoxybenzoate, ethyl 4-oxopentanoate, ethyl aalicylate, ethyl acetate, ethyl acetoacetate, ethyl acrylate, ethyl alcohol, ethyl benzoate, ethyl benzoylacetate, ethyl butyl ketone, ethyl butyraldehyde, ethyl butyrate, ethyl butyrylacetate, ethyl caproate, ethyl caprylate, ethyl cinnamate, ethyl crotonate, ethyl cyclohexanecarboxylate, ethyl cyclohexanepropionate, ethyl E-2-hexenoate, ethyl formate, ethyl isobutyrate, ethyl isovalerate, ethyl lactate, ethyl methyl carbonate, ethyl methylphenylglycidate, ethyl nitrite, ethyl n-valerate, ethyl phenylacetate, ethyl propionate, ethyl pyruvate, ethyl salicylate, ethyl sorbate, ethyl sulfide, ethyl tiglate, ethyl trans-2-octenoate, ethyl trans-4-decenoate, ethyl vanillin, ethyl vanillin propylene glycol acetal, ethylene brassylate, ethylene mercaptan, ethylenediamine, ethylenediamine dihydrochloride, ethylenediaminetetraacetate dihydrate, ethylenediaminetetraacetic acid, ethylenediaminetetraacetic acid, disodium salt, ethylsulfuric acid, eugenol, eugenyl acetate, farnesene, farnesol, fenchyl alcohol, ferric chloride, ferric oxide, ferric sulfate, folic acid, formaldehyde, formic acid, fructose 1,6-diphosphate disodium salt, fructose-6-phosphate, fumaric acid, furaneol, furfural, furfural acetone, furfuryl 3-methylbutanoate, furfuryl acetate, furfuryl alcohol, furfuryl butyrate, furfuryl isopropyl sulfide, furfuryl mercaptan, furfuryl methyl sulfide, furfuryl propionate, furfuryl thiopropionate, furfurylmethylether, fusidic acid sodium salt, galactaric acid, gallic acid, gamma-butyrolactone, gamma-decalactone, gamma-nonanolactone, gamma-octanoic lactone, gamma-undecalactone, gamma-valerolactone, gentisic acid, geraniol, geranyl acetate, geranyl acetoacetate, geranyl acetone, geranyl benzoate, geranyl formate, geranyl isobutyrate, geranyl isovalerate, geranyl N-butyrate, geranyl phenylacetate, geranyl propionate, glucoheptonic acid, gluconic acid, gluconic acid potassium salt, glucose-1-phosphate dipotassium salt, glutamic acid, glutamine, glutaraldehyde, glutaric acid, glutaric acid, 2-oxo-, glycerin, glycine, glycine ethyl ester hydrochloride, glycocholic acid, glycolic acid, guaiacyl phenyl acetate, guanosine-5'-monophosphate, disodium salt, heliotropine, hexaldehyde, hexane, hexyl 2-formate, hexyl 2-methylbutyrate, hexyl benzoate, hexyl butanoate, hexyl crotonate, hexyl formate, hexyl hexanoate, hexyl phenylacetate, hexyl propionate, hippuric acid, histidine, hydrazine, hydriodic acid, hydrobromic acid, hydrochloric acid, hydrogen peroxide, hydroquinone, hydroquinone dimethyl ether, hydroxycitronellal, hydroxycitronellol, hydroxymethylpyrone, hydroxyproline, hydroxypyruvate, iberverin, indole, inosine-5'-monophosphate sodium salt, inositol 1-phosphate, iron, iron (II)sulfate heptahydrate, isoamyl 2-methylbutyrate, isoamyl 3-(2-furyl)propionate, isoamyl alcohol, isoamyl benzoate, isoamyl cinnamate, isoamyl formate, isoamyl hexanoate, iso-amyl mercaptan, isoamyl n-butyrate, isoamyl propionate, isoamyl pyruvate, isoamyl salicylate, isoamylamine, isoborneol, isobornyl acetate, isobornyl isovalerate, isobornyl propionate, isobutyl 2-butenoate, isobutyl acetate, isobutyl anthranilate, isobutyl benzoate, isobutyl cis-2-methyl-2-butenoate, isobutyl formate, isobutyl isobutyrate, isobutyl isopentanoate, isobutyl mercaptan, isobutyl n-butyrate, isobutyl n-hexanoate, isobutyl phenylacetate, isobutyl propionate, isobutyl salicylate, isobutyraldehyde, isobutyric acid, isocaproic acid, isodihydro lavandulal, isoeugenol, isoeugenyl phenyl acetate, isoheptanol, isohexenyl cyclohexenyl carboxaldehyde, isoleucine, isopentyl acetate, isopentyl isopentanoate, isophorone, isopropyl 2-methylbutanoate, isopropyl 3-methylbutanoate, isopropyl acetate, isopropyl alpha-methylcrotonate, isopropyl benzoate, isopropyl formate, isopropyl hexanoate, isopropyl isobutyrate, isopropyl mercaptan, isopropyl N-butyrate, isopropyl phenylacetate, isopropyl propionate, isopulegol, isopulegyl acetate, isoquinoline, isovaleraldehyde, L-(−)-apple acid, L-(−)-carvone, L-(−)-fucose, L-(+)-arabinose, L-(+)-arginine monohydrochloride, L-(+)-isoleucine, L-(+)-lactic acid, L-(+)-tartaric acid, L-2-aminopropionic acid, lactic acid, lactitol, lactitol monohydrate, lactobionic acid, L-ascorbic acid sodium salt, L-asparagine, L-aspartic acid, lauric acid, L-borneol, L-bornyl acetate, L-carnitine, L-cysteine hydrochloride, leucine, levulinic acid, L-glutamic acid, L-glutamic acid hydrochloride, L-glutamic acid monopotassium salt, L-glutamine, L-histidine hydrochloride monohydrate, L-histidine methyl ester dihydrochloride, L-hydroxyproline, linalool, linalyl acetate, linalyl anthranilate, linalyl cinnamate, linalyl formate, linalyl isovalerate, linalyl phenylacetate, L-leucine, L-leucine methyl ester hydrochloride, L-linalool, L-malic acid, L-menthol, L-menthone, L-methionine, L-monosodium glutamate, L-proline, L-serine, L-threonine, L-tyrosine ethyl ester hydrochloride, L-valine, lysine, magnesium carbonate hydroxide, magnesium chloride, magnesium chloride hexahydrate, magnesium fumarate, magnesium gluconate, magnesium hydrogen phosphate trihydrate, magnesium hydroxide, magnesium phosphate tribasic, magnesium sulfate, magnesium sulfate heptahydrate, maleic acid, malic acid, malonaldehyde, malonaldehyde, sodium salt, malonic acid, maltitol, maltol isobutyrate, maltol propionate, mandelic acid, manganese (II) sulfate monohydrate, manganese chloride, manganese gluconate, mannitol, m-cresol, m-dimethoxybenzene, menthalactone, menthofuran, menthyl acetate, menthyl isovalerate, meso-inositol, meta-phenylenediamine, meta-phenylenedimine, methanesulfonic acid, methanol, methoxycinnamaldehyde, methyl 2,4-decadienoate, methyl 2-furoate, methyl 2-methoxybenzoate, methyl 2-methylbutanoate, methyl 2-methylpentanoate, methyl 2-naphthyl ketone, methyl 2-thiofuroate, methyl 3-(methylthio)propionate, methyl 3-hydroxyhexanoate, methyl 3-nonenoate, methyl 3-oxo-2-pentylcyclopentaneacetate, methyl 4-(methylthio)butyrate, methyl 4-hydroxybenzoate, methyl 4-methoxybenzoate, methyl 4- methyl pentanoate, methyl 4-phenylbutyrate, methyl acetate, methyl acrylate, methyl anthranilate, methyl benzaldehyde, methyl benzoate, methyl b-phenylpropionate, methyl butyrate, methyl caproate, methyl cinnamate, methyl cyclohexanecarboxylate, methyl e-2-octenoate, methyl ethyl ketone, methyl furfuryl disulfide, methyl heptyne carbonate, methyl isobutenyl ketone, methyl isobutyl ketone, methyl isobutyrate, methyl isopropenyl ketone, methyl isovalerate, methyl mercaptan, methyl methacrylate, methyl n-amyl ketone, methyl nicotinate, methyl pentanoate, methyl phenyl disulfide, methyl phenylacetate, methyl propionate, methyl propyl disulfide, methyl p-tert-butylphenylacetate, methyl salicylate, methyl valeraldehyde, methylethyl disulfide, methyleugenol, methylglyoxal, methylphenol, hydrogen sulfate, methylsulfuric acid sodium salt, methylthioethane, methyl-urea, mineral oil, m-methoxybenzoic acid, morpholine, musk ketone, N-(2-hydroxyethyl)morpholine, N-(2-hydroxyethyl)pyrrolidine, N,2,3-trimethyl-2-isopropylbutamide, N,N- dimethylethanolamine, nabam, N-acetylglycine, N-acetyl-L-methionine, n-amyl ethyl ketone, n-amyl formate, n-amyl n-caproate, naphthalene, 2-(2-methylpropoxy)-, naphthalene, 2-ethoxy-, naphthalene-1,5-disulfonic acid, naphthalene-2-sulfonic acid, N-benzyl-2-phenylethylamine, n-butanol, n-butyl lactate, n-butyl n-caproate, n-butyl pentanoate, n-butyl propionate, n-butyl salicylate, n-butylamine, n-butyric acid, n-decanoic acid, neosperidin dihydrochalcone, neral, nerol, nerol oxide, neryl acetate, neryl butyrate, neryl formate, neryl isovalerate, N-ethyl-p-menthane-3-carboxamide, n-hexanoic acid, n-hexanol, n-hexyl acetate, n-hexyl mercaptan, niacin, nickel, nicotinamide, nicotinic acid, nitric acid, nitrilotriacetic acid trisodium salt, nitrosyl chloride, nitrous oxide, N-methyl-D-glucamine, nonalactone, nonivarnide, nopol, n-propanol, n-propyl acetate, n-propyl benzoate, n-propyl butyrate, n-propyl isobutyrate, n-tetradecanoic acid, n-valeraldehyde, o-aminoacetophenone, o-cresol, octafluorocyclobutane, octahydrocoumarin, octanoic acid, oleic acid, o-methoxybenzaldehyde, o-methoxybenzoic acid, o-methoxycinnamaldehyde, o-methoxyphenyl acetate, o-methylanisole, o-methylbenzoic acid, orotic acid, orthoboric acid, ortho-sec-butyl cyclohexanone, o-toluenethiol, o-toluic acid, o-tolyl acetate, o-tolyl isobutyrate, oxalic acid, p-acetamidobenzoic acid, palmitic acid, pamoic acid, p-anisaldehyde, p-anise alcohol, p-cresol, p-cresyl alpha-toluate, p-cresyl isovalerate, p-cymen-8-ol, p-dimethylaminobenzaldehyde, pectin sugar, perillol, perillyl aldehyde, periodic acid, peroxyacetic acid, p-formylacetanilide, phenethyl 2-furoate, phenethyl acetate, phenethyl alcohol, phenethyl anthranilate, phenethyl benzoate, phenethylamine, phenol, phenol, 2-(methylthio)-, phenoxy ethyl isobutyrate, phenoxyacetic acid, phenyl acetate, phenyl ether, phenylacetaldehyde diisobutylacetal, phenylacetaldehyde dimethyl acetal, phenylacetaldehyde glyceryl acetal, phenylacetic acid, phenylalanine, phenylethanal, phenylethyl isovalerate, phenylmercaptan, phenylpyruvate, phosphoric acid, phosphorus oxychloride, picric acid, piperazine, piperidine, piperine, piperitenone, piperonyl acetate, p-isopropyl phenylacetaldehyde, p-isopropylacetophenone, pivalic acid, p-menth-1-en-8-yl propionate, p-menthan-2-one, p-methyl hydratropaldehyde, p-methylacetophenone, potassium acetate, potassium benzoate, potassium bicarbonate, potassium bisulfate, potassium bitartrate, potassium bromide, potassium carbonate, potassium carbonate, sesquihydrate, potassium chloride, potassium citrate, potassium citrate, monohydrate, potassium diphosphate, potassium fluoride, potassium hydroxide, potassium hypophosphite, potassium iodate, potassium iodide, potassium lactate, potassium metabisulfite, potassium metaphosphate, potassium nitrate, potassium nitrite, potassium permanganate, potassium persulfate, potassium phosphate monobasic, potassium phosphate, dibasic, potassium phosphate, tribasic, n-hydrate, potassium sodium tartrate, potassium sorbate, potassium sulfate, potassium sulfite, potassium thiocyanate, potassium, citrate, monohydrate, p-phenylenediamine, procaine, procaine hydrochloride, proline, propanoic acid, 2-hydroxy-, calcium salt (2:1), propanoic acid, 2-hydroxy-, calcium salt (2:1), (S)-, propanoic acid, 2-methyl-, 4-methylphenyl ester, propargyl alcohol, propionaldehyde, propionic acid, propionic acid, sodium salt, propiophenone, propyl formate, propyl gallate, propyl hexanoate, propyl isopentanoate, propyl mercaptan, propyl paraben, propyl phenylacetate, propyl propionate, propylene glycol, p-toluenesulfonic acid, p-toluenesulfonic acid monohydrate, p-tolyl acetate, p-vinylphenol, pyrazineethanethiol, pyridoxine hydrochloride, pyroglutamic acid, pyrrole, pyrrolidine, pyruvic acid, pyruvic acid sodium salt, quinine hydrochloride, quinine sulfate, dihydrate, quinoline, quinone, R-carvone, resorcinol, riboflavin, riboflavin 5'-(dihydrogen phosphate), monosodium salt, riboflavin-5-phosphate, ribose, ribose 5-phosphate, rose oxide, sabinene hydrate, saccharin, saccharin sodium, saccharin sodium, dihydrate, saccharin, sodium salt hydrate, salicylic acid, salicylylaldehyde, sebacic acid, sec-amyl alcohol, sec-butyl alcohol, serine, S-ethyl thioacetate, sodium (2-ethylhexyl)alcohol sulfate, sodium acetate, sodium acetate trihydrate, sodium aluminate, sodium benzoate, sodium bicarbonate, sodium bisulfite, sodium borohydride, sodium bromide, sodium carbonate, sodium carbonate monohydrate, sodium chloride, sodium chlorite, sodium citrate, dihydrate, sodium dehydroacetate, sodium dithionate dihydrate, sodium dithionite, sodium dodecyl sulfate, sodium D-pantothenate, sodium fluoride, sodium formate, sodium gluconate, sodium hexametaphosphate, sodium hydrogen phosphate, sodium hydroxide, sodium hypochlorite, sodium iodide, sodium lactate, sodium malonate, sodium metabisulfite, sodium monophosphate, sodium nitrate, sodium nitrite, sodium phosphate monobasic, sodium polymethacrylate, sodium potassium tartrate, tetrahydrate, sodium pyrophosphate, sodium salicylate, sodium silicate, sodium sorbate, sodium sulfate, sodium sulfate decahydrate, sodium sulfide, sodium sulfite, sodium tartrate, sodium taurocholate, sodium thiocyanate, sodium thiosulfate, sodium thiosulfate pentahydrate, sodium tripolyphosphate, sorbic acid, sorbitol, stearic acid, styrallyl acetate, succinic acid, succinic acid, disodium salt, succinic anhydride, sucrose, sucrose diacetate hexaisobutyrate, sulfamic acid, sulfosalicylic acid, sulfosalicylic acid, dihydrate, sulfric acid, zinc salt (1:1), heptahydrate, sulfuric acid, sulfuric acid, zinc salt (1:1), heptahydrate, sulfurous acid, tartaric acid, taurine, taurocholic acid, t-butyl alcohol, terephthalic acid, terpinen-4-ol, terpinyl acetate, tert-butylhydroquinone, tetrahydro-2-furanmethanol, tetrahydro-2-furanmethanol acetate, tetrahydrofurfuryl butyrate, tetramethyl-pyrazine, tetrasodium ethylenediaminetetraacetate, theophylline-7-acetic acid, thiamine hydrochloride, thiamine nitrate, thiazole, thiazole, 2,5-dimethyl-, thioanisole, thiobenzoic acid, S-methyl ester, thiocyanic acid, thiophene, 2,2'-dithiobis-, thiophenethiol, thiourea, threonine, thujone, thymol, tiglic acid, tiron, titanium dioxide, trans beta-(2-furyl)acrolein, trans,cis-2,6-dodecadien-1-al, trans,cis-2,6-nonadien-1-ol, trans,trans-2,4-decadienal, trans-2,trans-6-nonadienal, trans-2-hexen-1-ol, trans-2-hexenal, trans-2-hexenoic acid, trans-2-hexenyl butyrate, trans-2-hexenyl formate, trans-2-hexenyl isovalerate, trans-2-hexenyl propionate, trans-2-hexenyl valerate, trans-2-octen-1-yl acetate, trans-2-octen-4-ol, trans-2-octenal, trans-3-hexenal, trans-3- phenyl-2-propen-1-ol, trans-cinnamic aldehyde, trans-citral, triacetin, trichloroacetic acid, triethanolamine, triethyl citrate, trifluoromethanesulfonic acid, trihydroxybutyrophenone, trimethylamine, trimethyl-pyrazine, tri-n-butyrin, triphosphoric acid, pentapotassium salt, tripropionin, trisodium citrate, trisodium phosphate, Triton® X-100, tryptophan, tyrosine, urea, valeric acid, valine, valproic acid, vanillin, veratraldehyde, veratrole, vitamin B1, vitamin C, vitamin E, vitamin P, vitamin U chloride, xylitol, zeranol, zinc acetate, zinc acetate dihydrate, zinc carbonate, zinc chloride, zinc hydrosulfite, and zinc oxide.

Other Components

In some embodiments, the composition including the cocrystals includes a carrier fluid. The carrier fluid can be any suitable carrier fluid. The carrier fluid can be any downhole fluid. In some embodiments, the carrier fluid is at least one of an aqueous liquid and an organic liquid. The carrier fluid can be at least one of dipropylene glycol methyl ether, dipropylene glycol dimethyl ether, dimethyl formamide, diethylene glycol methyl ether, ethylene glycol butyl ether, diethylene glycol butyl ether, propylene carbonate, D-limonene, a $C_2$-$C_{40}$ fatty acid $C_1$-$C_{10}$ alkyl ester, 2-butoxy ethanol, butyl acetate, furfuryl acetate, dimethyl sulfoxide, and dimethyl formamide. In some embodiments, the carrier fluid is about 0.001 wt % to about 99.999 wt % of the composition, or about 50 wt % to about 99 wt % of the composition, or about 0.001 wt % or less, or about 0.01 wt %, 0.5, 0.1, 1, 2, 3, 4, 5, 10, 15, 20, 30, 40, 50, 60, 70, 80, 85, 90, 95, 96, 97, 98, 99, 99.5, 99.9, 99.99, or about 99.999 wt % or more of the composition.

In various embodiments, the composition can include a scale dissolver. As used herein, the term "scale dissolver" means any substance that dissolves scale present within a hydrocarbon producing system. Scale dissolvers are well known to those skilled in the art and include, for example, alkaline solutions such as solutions of potassium carbonate and potassium hydroxide, or a solution of a salt of ethylenediaminetetracetic acid (EDTA) or diethylenetriaminepentacetic acid (DTPA). In some examples, the scale dissolver can be a polycarboxylic acid or salts thereof, such as amino-polycarboxylic acids or salts thereof.

Downhole Mixture or Composition

The composition including cocrystals can be combined with any suitable downhole fluid before, during, or after the placement of the composition in the subterranean formation or the contacting of the composition and the subterranean material. In some examples, the cocrystals are combined with a downhole fluid above the surface, then the combined composition is placed in a subterranean formation or is contacted with a subterranean material. In another example, the cocrystals are injected into a subterranean formation to combine with a downhole fluid, and the combined composition is contacted with a subterranean material or is considered to be placed in the subterranean formation. In various examples, at least one of prior to, during, and after the placement of the composition in the subterranean formation or contacting of the subterranean material and the composition, the composition is used downhole, at least one of alone and in combination with other materials, as a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof In various embodiments, the method includes combining the composition including cocrystals with any suitable downhole fluid, such as an aqueous or oil-based fluid including a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof, to form a mixture. The placement of the composition in the subterranean formation can include contacting the subterranean material and the mixture. The contacting of the subterranean material and the composition can include contacting the subterranean material and the mixture. A mixture that is placed in the subterranean formation or contacted with the subterranean material can include any suitable weight percent of the composition including cocrystals, such as about 0.000,000,01 wt % to 99.999,99 wt %, 0.000,1-99.9 wt %, 0.1 wt % to 99.9 wt %, or about 20-90 wt %, or about 0.000,000,01 wt % or less, or about 0.000,001 wt %, 0.000,1, 0.001, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99, 99.999, 99.999,9, or about 99.999,99 wt % or more of the composition.

In some embodiments, the composition can include any suitable amount of any suitable material used in a downhole fluid. For example, the composition can include water, saline, aqueous base, oil, organic solvent, synthetic fluid oil phase, aqueous solution, alcohol or polyol, cellulose, starch, alkalinity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, dispersants, salts, fibers, thixotropic additives, breakers, crosslinkers, rheology modifiers, curing accelerators, curing retarders, pH modifiers, chelating agents, scale inhibitors, enzymes, resisn, water control materials, oxidizers, markers, Portland cement, pozzolana cement, gypsum cement, high alumina content cement, slag cement, silica cement fly ash, metakaolin, shale, zeolite, a crystalline silica compound, amorphous silica, hydratable clays, microspheres, pozzolan lime, or a combination thereof.

A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill head as well as reducing friction between the drill string and the sides of the hole. The drilling fluid aids in support of the drill pipe and drill head, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks penetrated and also to form a thin, low permeability filter cake which temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase.

A water-based drilling fluid in embodiments of the present invention can be any suitable water-based drilling fluid. In various embodiments, the drilling fluid can include at least one of water (fresh or brine), a salt (e.g., calcium chloride, sodium chloride, potassium chloride, magnesium chloride, calcium bromide, sodium bromide, potassium bromide, calcium nitrate, sodium formate, potassium formate, cesium formate), aqueous base (e.g., sodium hydroxide or potassium hydroxide), alcohol or polyol, cellulose, starches, alkalinity control agents, density control agents such as a density modifier (e.g. barium sulfate), surfactants (e.g. betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, solvents, diluents, plasticizers, filler or inorganic particles (e.g. silica), pigments, dyes, precipitating agents (e.g., silicates or aluminum complexes), and rheology modifiers such as thickeners or viscosifiers (e.g., xanthan gum). Any ingredient listed in this paragraph can be either present or not present in the mixture. The drilling fluid can be present in the mixture with the composition including cocrystals in any suitable amount, such as about 1 wt % or less, about 2 wt %, 3, 4, 5, 10, 15, 20, 30, 40, 50, 60, 70, 80, 85, 90, 95, 96, 97, 98, 99, 99.9, 99.99, 99.999, or about 99.9999 wt % or more of the mixture.

An oil-based drilling fluid or mud in embodiments of the present invention can be any suitable oil-based drilling fluid. In various embodiments the drilling fluid can include at least one of an oil-based fluid (or synthetic fluid), saline, aqueous solution, emulsifiers, other agents of additives for suspension control, weight or density control, oil-wetting agents, fluid loss or filtration control agents, and rheology control agents. For example, see H. C. H. Darley and George R. Gray, Composition and Properties of Drilling and Completion Fluids 66-67, 561-562 (5$^{th}$ ed. 1988). An oil-based or invert emulsion-based drilling fluid can include between about 50:50 to about 95:5 by volume of oil phase to water phase. A substantially all oil mud includes about 100% liquid phase oil by volume; e.g., substantially no internal aqueous phase.

A pill is a relatively small quantity (e.g. less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

A cement fluid can include an aqueous mixture of at least one of cement and cement kiln dust. The composition including cocrystals can form a useful combination with cement or cement kiln dust. The cement kiln dust can be any suitable cement kiln dust. Cement kiln dust can be formed during the manufacture of cement and can be partially calcined kiln feed which is removed from the gas stream and collected in a dust collector during manufacturing process. Cement kiln dust can be advantageously utilized in a cost-effective manner since kiln dust is often regarded as a low value waste product of the cement industry. Some embodiments of the cement fluid can include cement kiln dust but no cement, cement kiln dust and cement, or cement but no cement kiln dust. The cement can be any suitable cement. The cement can be a hydraulic cement. A variety of cements can be utilized in accordance with embodiments of the present invention, for example, those including calcium, aluminum, silicon, oxygen, iron, or sulfur, which can set and harden by reaction with water. Suitable cements can include Portland cements, pozzolana cements, gypsum cements, high alumina content cements, slag cements, silica cements, and combinations thereof. In some embodiments, the Portland cements that are suitable for use in embodiments the present invention are classified as Classes A, C, H, and G cements according to the American Petroleum Institute, *API Specification for Materials and Testing for Well Cements*, API Specification 10, Fifth Ed., Jul. 1, 1990. A cement can be generally included in the cementing fluid in an amount sufficient to provide the desired compressive strength, density, or cost. In some embodiments, the hydraulic cement can be present in the cementing fluid in an amount in the range of from 0 wt % to about 100 wt %, 0-95 wt %, 20-95 wt %, or about 50-90 wt %. A cement kiln dust can be present in an amount of at least about 0.01 wt %, or about 5 wt %-80 wt %, or about 10 wt % to about 50 wt %.

Optionally, other additives can be added to a cement or kiln dust-containing composition of embodiments of the present invention as deemed appropriate by one skilled in the art, with the benefit of this disclosure. Any optional ingredient listed in this paragraph can be either present or not present in the composition. For example, the composition can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives can include crystalline silica compounds, amorphous silica, salts, fibers, hydratable clays, microspheres, pozzolan lime, thixotropic additives, combinations thereof, and the like.

In various embodiments, the present invention can include a proppant, a resin-coated proppant, an encapsulated resin, or a combination thereof. A proppant is a material that keeps an induced hydraulic fracture at least partially open during or after a fracturing treatment. Proppants can be transported downhole to the fracture using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, manmade materials such as ceramic proppant. In some embodiments, proppant can have an average particle size of about 0.15 mm to about 2.5 mm, about 0.25-0.43 mm, 0.43-0.85 mm, 0.85-1.18 mm, 1.18-1.70 mm, and 1.70-2.36 mm.

System

In various embodiments, the present invention provides a system. The system can include a composition including cocrystals, wherein each cocrystal independently includes a scale-inhibiting compound and a secondary material. The system can also include a subterranean formation having the composition therein, or including a subterranean material in contact with the composition. In some embodiments, the composition can also include a downhole fluid. In some embodiments, the downhole fluid is a composition for fracturing or a subterranean material, or a fracturing fluid.

The downhole fluid can include a crosslinker compound that includes at least one of chromium, aluminum, antimony, zirconium, titanium, calcium, boron, iron, silicon, copper, zinc, magnesium, and an ion thereof. In some examples, the downhole fluid is a viscous gel- or crosslinked gel-containing fracturing fluid with proppant suspended therein.

Composition for Treatment of a Subterranean Formation

Various embodiments provide a composition for treatment of a subterranean formation. The composition can be any suitable composition that can be used to perform an embodiment of the method for treatment of a subterranean formation described herein. For example, the composition can include a composition for treatment of a subterranean formation including cocrystals, wherein each cocrystal independently includes a scale-inhibiting compound and a secondary material.

In some embodiments, the composition further includes a downhole fluid. The downhole fluid can be any suitable downhole fluid. In some embodiments, the downhole fluid is a composition for fracturing or a subterranean material, or a fracturing fluid. The downhole fluid can include a crosslinker compound that includes at least one of chromium, aluminum, antimony, zirconium, titanium, calcium, boron, iron, silicon, copper, zinc, magnesium, and an ion thereof. In some examples, the downhole fluid is a viscous gel- or crosslinked gel-containing fracturing fluid with proppant suspended therein.

Method for Preparing a Composition for Treatment of a Subterranean Formation

In various embodiments, the present invention provides a method for preparing a composition for treatment of a subterranean formation. The method can be any suitable method that produces a composition described herein. For example, the method can include forming a composition including cocrystals, wherein each cocrystal independently includes a scale-inhibiting compound, and a secondary material. The cocrystals can be formed in any suitable manner, such as by melting and blending together the scale-inhibiting compound and the secondary material, and allowing the blend to cool and recrystallize to form the cocrystals; or, by dissolving the scale-inhibiting compound and the secondary material in a common solution, and allowing the solution to evaporate or otherwise reducing the solubility of the materials in the solution, forming the cocrystals.

The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those of ordinary skill in the art, and that such modifications and variations are considered to be within the scope of this invention as defined by the appended claims.

Additional Embodiments

The present invention provides for the following exemplary embodiments, the numbering of which is not to be construed as designating levels of importance:

Embodiment 1 provides a method of treating a subterranean formation, the method comprising: obtaining or providing a composition comprising cocrystals, each cocrystal independently comprising a scale-inhibiting compound; and a secondary material; and placing the composition in a subterranean formation.

Embodiment 2 provides the method of Embodiment 1, wherein the method comprises a method of hydraulic fracturing.

Embodiment 3 provides the method of any one of Embodiments 1-2, wherein the method comprises a method of inhibiting scale formation downhole.

Embodiment 4 provides the method of any one of Embodiments 1-3, wherein placing the composition in the subterranean formation comprises placing the composition in at least one of a fracture, at least a part of an area surrounding a fracture, a flow pathway, an area surrounding a flow pathway, and an area desired to be fractured.

Embodiment 5 provides the method of Embodiment 4, wherein the method further comprises hydraulic fracturing to generate the fracture or flow pathway.

Embodiment 6 provides the method of any one of Embodiments 4-5, wherein the method further comprises performing a stimulation treatment before contacting the fracture or flow pathway with the composition.

Embodiment 7 provides the method of Embodiment 6, wherein the stimulation treatment comprises at least one of perforating, acidization, injecting of cleaning fluids, propellant stimulation, and hydraulic fracturing to at least partially generate the fracture or flow pathway.

Embodiment 8 provides the method of Embodiment 7, wherein the hydraulic fracturing comprises at least one of a pre-pad stage, a pad stage, or a slurry stage.

Embodiment 9 provides the method of any one of Embodiments 1-8, wherein placing of the composition in the subterranean formation occurs during a squeeze operation.

Embodiment 10 provides the method of any one of Embodiments 1-9, wherein the obtaining or providing of the composition occurs above-surface.

Embodiment 11 provides the method of any one of Embodiments 1-10, wherein the obtaining or providing of the composition occurs downhole.

Embodiment 12 provides the method of any one of Embodiments 1-11, wherein the placing the composition in the subterranean formation comprises at least partially depositing the cocrystals in a fracture or flow pathway.

Embodiment 13 provides the method of any one of Embodiments 1-12, further comprising inhibiting scale downhole.

Embodiment 14 provides the method of Embodiment 13, wherein the scale inhibition comprises reaction between scale-forming materials and the cocrystal.

Embodiment 15 provides the method of any one of Embodiments 13-14, further comprising dissociating at least some of the scale-inhibiting compound from the cocrystal, to give a released scale-inhibiting compound, wherein the scale inhibition comprises reaction between scale-forming materials and the released scale-inhibiting compound.

Embodiment 16 provides the method of Embodiment 15, wherein the released scale-inhibiting compound comprises one or more crystals.

Embodiment 17 provides the method of any one of Embodiments 15-16, wherein the released scale-inhibiting compound is at least partially dissolved in surrounding solution.

Embodiment 18 provides the method of any one of Embodiments 15-17, wherein the dissociation occurs at least one of during and after the placing the composition in the subterranean formation.

Embodiment 19 provides the method of any one of Embodiments 15-18, comprising triggering the dissociation.

Embodiment 20 provides the method of Embodiment 19, wherein the triggering occurs at least one of during and after the placing of the composition in the subterranean formation.

Embodiment 21 provides the method of any one of Embodiments 19-20, wherein the triggering comprises exposing at least some of the cocrystals to at least one of a compression wave, a chemical activator, heat, pH change, pressure, friction, passage of time, and vibration.

Embodiment 22 provides the method of Embodiment 21, wherein the compression wave is produced by an explosion.

Embodiment 23 provides the method of any one of Embodiments 19-22, wherein the triggering comprises exposing at least some of the cocrystals to closure of a fracture or flow pathway.

Embodiment 24 provides the method of any one of Embodiments 19-23, wherein the triggering occurs while at least some of the cocrystals are within a fracture or flow pathway.

Embodiment 25 provides the method of any one of Embodiments 1-24, further comprising placing a detonatable material proximate to at least some of the cocrystals downhole.

Embodiment 26 provides the method of any one of Embodiments 1-25, wherein the cocrystals are sufficient to at least partially inhibit scale downhole.

Embodiment 27 provides the method of Embodiment 26, wherein the method comprises at least partially dissociating the scale-inhibiting compound from the cocrystal, wherein the dissociated scale-inhibiting compound is sufficient to at least partially inhibit scale downhole.

Embodiment 28 provides the method of Embodiment 27, wherein the cocrystals are less effective to inhibit scale than the dissociated scale-inhibiting compound.

Embodiment 29 provides the method of any one of Embodiments 27-28, wherein the scale-inhibiting compound in the cocrystals is less effective to inhibit scale than the dissociated scale-inhibiting compound.

Embodiment 30 provides the method of any one of Embodiments 27-29, wherein the scale-inhibiting compound in the cocrystal is less reactive with a crosslinker or ion therefrom in a surrounding solution than the dissociated scale-inhibiting compound.

Embodiment 31 provides the method of any one of Embodiments 27-30, wherein the composition comprising the cocrystals maintains a greater concentration of dissociated scale inhibitor in a surrounding solution over time in the presence of a crosslinker or ion from a crosslinker than a corresponding scale inhibitor placed in the subterranean formation that did not originate from the cocrystal downhole.

Embodiment 32 provides the method of any one of Embodiments 27-31, wherein the composition comprising the cocrystals delays delivery of the dissociated scale inhibitor longer than a corresponding scale inhibitor placed in the subterranean formation that did not originate from the cocrystal downhole.

Embodiment 33 provides the method of any one of Embodiments 27-32, wherein the dissociated scale-inhibiting compound binds or chelates at least one of $Fe^{2+}$, $Ca^{2+}$, $Mg^{2+}$, $Sr^{2+}$, and $Ba^{2+}$.

Embodiment 34 provides the method of any one of Embodiments 1-33, wherein the compound is in the subterranean formation while the subterranean formation has therein at least one of a gel, a crosslinked gel, and a crosslinker or an ion from a crosslinker.

Embodiment 35 provides the method of Embodiment 34, wherein the gel or crosslinked gel is at least one of poly (acrylic acid), poly(acrylate), poly(vinyl acetate), poly(vinyl alcohol), poly(ethylene glycol), poly(vinyl pyrrolidone), polyacrylamide, poly (hydroxyethyl methacrylate), starch, tamarind, tragacanth, guar gum, gum ghatti, gum arabic, locust bean gum, acetan, alginate, chitosan, curdlan, a cyclosophoran, dextran, diutan, emulsan, a galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, welan, cellulose, carboxymethyl cellulose, hydroxyethyl cellulose, carboxymethyl hydroxyethyl cellulose, hydroxypropyl cellulose, methyl hydroxyl ethyl cellulose, guar, hydroxypropyl guar, carboxy methyl guar, and carboxymethyl hydroxylpropyl guar.

Embodiment 36 provides the method of any one of Embodiments 34-35, wherein the gel or crosslinked gel is at least one of cellulose, carboxymethyl cellulose, hydroxyethyl cellulose, carboxymethyl hydroxyethyl cellulose, hydroxypropyl cellulose, methyl hydroxyl ethyl cellulose, guar, hydroxypropyl guar, carboxy methyl guar, and carboxymethyl hydroxylpropyl guar Embodiment 37 provides the method of any one of Embodiments 34-36, wherein the crosslinker comprises at least one of chromium, aluminum, antimony, zirconium, titanium, calcium, boron, iron, silicon, copper, zinc, magnesium, and an ion thereof.

Embodiment 38 provides the method of any one of Embodiments 34-37, wherein the crosslinker is at least one of boric acid, borax, ferric chloride, disodium octaborate tetrahydrate, sodium diborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate.

Embodiment 39 provides the method of any one of Embodiments 34-38, wherein the crosslinker is at least one of boric acid, borax, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, and zirconium lactate glycolate.

Embodiment 40 provides the method of any one of Embodiments 1-39, wherein the composition further comprises a carrier fluid.

Embodiment 41 provides the method of Embodiment 40, wherein the carrier fluid comprises at least one of an aqueous liquid and an organic liquid.

Embodiment 42 provides the method of any one of Embodiments 40-41, wherein the carrier fluid comprises at least one of dipropylene glycol methyl ether, dipropylene glycol dimethyl ether, dimethyl formamide, diethylene glycol methyl ether, ethylene glycol butyl ether, diethylene glycol butyl ether, propylene carbonate, D-limonene, a $C_2$-$C_{40}$ fatty acid $C_1$-$C_{10}$ alkyl ester, 2-butoxy ethanol, butyl acetate, furfuryl acetate, dimethyl sulfoxide, and dimethyl formamide.

Embodiment 43 provides the method of any one of Embodiments 40-42, wherein the carrier fluid is about 0.001 wt % to about 99.999 wt % of the composition.

Embodiment 44 provides the method of any one of Embodiments 40-43, wherein the carrier fluid is about 50 wt % to about 99 wt % of the composition.

Embodiment 45 provides the method of any one of Embodiments 1-44, wherein the composition comprising the cocrystals has a viscosity of about 0.01 cP to about 10,000 cP at standard temperature and pressure.

Embodiment 46 provides the method of any one of Embodiments 1-45, wherein the composition comprising the cocrystals has a viscosity of about 0.05 cP to about 1,500 cP.

Embodiment 47 provides the method of any one of Embodiments 1-46, wherein the composition further comprises a viscosifier comprising a gel or crosslinked gel.

Embodiment 48 provides the method of Embodiment 47, wherein the viscosifier comprises a crosslinker.

Embodiment 49 provides the method of any one of Embodiments 47-48, wherein the viscosifier is about 0.001 wt % to about 99.999 wt % of the composition.

Embodiment 50 provides the method of any one of Embodiments 47-49, wherein the viscosifier is about 0.001 wt % to about 50 wt % of the composition.

Embodiment 51 provides the method of any one of Embodiments 1-50, wherein the composition comprises a compound comprising at least one of chromium, aluminum, antimony, zirconium, titanium, calcium, boron, iron, silicon, copper, zinc, magnesium, and an ion thereof.

Embodiment 52 provides the method of any one of Embodiments 1-51, wherein the cocrystal comprises a crystalline structure comprising a unit cell comprising both the scale-inhibiting compound and the at least one secondary material.

Embodiment 53 provides the method of Embodiment 52, wherein the cocrystal comprises a crystal structure that is different from a crystal structure of a crystal of the scale-inhibiting compound alone.

Embodiment 54 provides the method of any one of Embodiments 52-53, wherein the cocrystal comprises a crystal structure that is different from a crystal structure of a crystal of the secondary material alone.

Embodiment 55 provides the method of any one of Embodiments 52-54, wherein the cocrystal comprises at least one property that is different than a corresponding property of a crystal of the scale-inhibiting compound alone.

Embodiment 56 provides the method of any one of Embodiments 52-55, wherein the cocrystal comprises at least one property that is different than a corresponding property of a crystal of the scale-inhibiting compound alone, wherein the property is at least one of density, melting point, solubility, rate of dissolution, reactivity, mechanical properties, volatility, hygroscopicity, water resistance, and toxicity.

Embodiment 57 provides the method of any one of Embodiments 52-56, wherein the cocrystal comprises at least one property that is different than a corresponding property of a crystal of the secondary material alone.

Embodiment 58 provides the method of any one of Embodiments 52-57, wherein the cocrystal comprises at least one property that is different than a corresponding property of a crystal of the secondary material alone, wherein the property is at least one of density, melting point, solubility, rate of dissolution, reactivity, mechanical properties, volatility, hygroscopicity, water resistance, and toxicity.

Embodiment 59 provides the method of any one of Embodiments 1-58, wherein the cocrystal comprises a crystal structure wherein the scale-inhibiting material and the secondary material interact via at least one of ionic interaction, ionic bonding, Van der Waals force, London dispersion force, dipole-dipole interaction, hydrogen bonding, metallic bond, pi-interaction, and cation-pi interaction.

Embodiment 60 provides the method of any one of Embodiments 1-59, wherein the cocrystal comprises at least one of a hydrate, a solvate, and a clathrate.

Embodiment 61 provides the method of any one of Embodiments 1-60, wherein the cocrystals are substantially spherical.

Embodiment 62 provides the method of any one of Embodiments 1-61, wherein the cocrystals are irregular.

Embodiment 63 provides the method of any one of Embodiments 1-62, wherein the cocrystals are nanoparticles.

Embodiment 64 provides the method of any one of Embodiments 1-63, wherein the cocrystals have a particle size of about 0.1 nm to about 10 mm.

Embodiment 65 provides the method of any one of Embodiments 1-64, wherein the cocrystals have a particle size of about 1 nm to about 5 mm.

Embodiment 66 provides the method of any one of Embodiments 1-65, wherein the cocrystals are about 0.000,000,1 wt % to about 99.999,999,9 wt % of the composition.

Embodiment 67 provides the method of any one of Embodiments 1-66, wherein the cocrystals are about 0.001 wt % to about 50 wt % of the composition.

Embodiment 68 provides the method of any one of Embodiments 1-67, wherein the cocrystals are at least partially coated on a proppant.

Embodiment 69 provides the method of Embodiment 68, wherein the coating has a thickness of about 1 nm to about 5 mm Embodiment 70 provides the method of any one of Embodiments 68-69, wherein the coating is substantially uniform.

Embodiment 71 provides the method of any one of Embodiments 68-70, wherein the coating substantially covers the proppant.

Embodiment 72 provides the method of any one of Embodiments 1-71, wherein the cocrystals are at least partially encapsulated by a protective shell.

Embodiment 73 provides the method of Embodiment 72, wherein the protective shell at least partially protects the cocrystals from the surrounding environment.

Embodiment 74 provides the method of any one of Embodiments 72-73, comprising triggering dissociation of the scale-inhibiting compound from at least some of the cocrystals comprising breaking or chemically dissolving at least part of the protective shell.

Embodiment 75 provides the method of any one of Embodiments 1-74, wherein the scale-inhibiting compound is sufficient to inhibit scale under downhole conditions at least one of in the cocrystal and in a dissociated state from the cocrystal.

Embodiment 76 provides the method of any one of Embodiments 1-75, wherein the scale-inhibiting compound is an organic or inorganic compound comprising at least one anionic moiety.

Embodiment 77 provides the method of any one of Embodiments 1-76, wherein the scale-inhibiting compound is at least one of a phosphonate, phosphate, sulfonate, acrylate, and a carboxylate.

Embodiment 78 provides the method of any one of Embodiments 1-77, wherein the scale-inhibiting compound comprises at least one of a —P(O)(OZ)OZ, —S(O)(O)OZ), and a —C(O)OZ group, where Z is independently selected from —H and Cl$^+$, wherein Cl$^+$ is a counterion.

Embodiment 79 provides the method of Embodiment 78, wherein Cl$^+$ is selected from the group consisting of Na$^+$, K$^+$, Li$^+$, H$^+$, Zn$^+$, NH$_4^+$, Ca$^{2+}$, Mg$^{2+}$, Zn$^{2+}$ and Al$^{3+}$.

Embodiment 80 provides the method of any one of Embodiments 1-79, wherein the scale-inhibiting compound is a polymer formed from a compound having one of the following structures

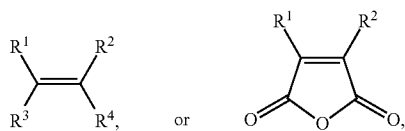

wherein R$^1$ is selected from the group consisting of —P(O)(OZ)OZ, —S(O)(O)OZ), —C(O)OZ, C$_1$-C$_{20}$ hydrocarbyl, C$_4$-C$_{20}$ aryl, and C$_1$-C$_{20}$ heteroaryl, wherein the hydrocarbyl, aryl, and heteroaryl group is substituted or unsubstituted, wherein the hydrocarbyl group is optionally interrupted by 1, 2, or 3 heteroatoms independently selected from O, S, and substituted or unsubstituted N, wherein the hydrocaryl, aryl, and heteroaryl group is substituted by at least one group selected from the group consisting of —P(O)(OZ)OZ, —S(O)(O)OZ), and —C(O)OZ, wherein Z is selected from the group consisting of —H and Cl$^+$ wherein Cl$^+$ is a counterion; and R$^2$, R$^3$, R$^4$ are independently selected from the group consisting of —H, C$_1$-C$_{20}$ hydrocarbyl, C$_4$-C$_{20}$ aryl, and C$_1$-C$_{20}$ heteroaryl, wherein the hydrocarbyl, aryl, and heteroaryl group is substituted or unsubstituted, wherein the hydrocarbyl group is optionally interrupted by 1, 2, or 3 heteroatoms independently selected from O, S, and substituted or unsubstituted N.

Embodiment 81 provides the method of any one of Embodiments 1-80, wherein the scale-inhibiting compound comprises at least one of the following structures as a repeating unit

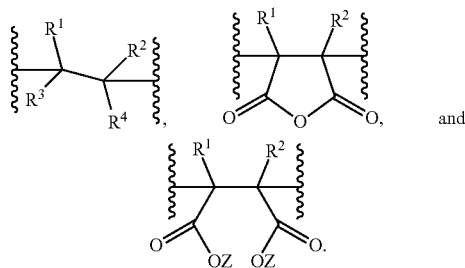

wherein R$^1$ is selected from the group consisting of —P(O)(OZ)OZ, —S(O)(O)OZ), —C(O)OZ, C$_1$-C$_{20}$ hydrocarbyl, C$_4$-C$_{20}$ aryl, and C$_1$-C$_{20}$ heteroaryl, wherein the hydrocarbyl, aryl, and heteroaryl group is substituted or unsubstituted, wherein the hydrocarbyl group is optionally interrupted by 1, 2, or 3 heteroatoms independently selected from O, S, and substituted or unsubstituted N, wherein the hydrocaryl, aryl, and heteroaryl group is substituted by at least one group selected from the group consisting of —P(O)(OZ)OZ, —S(O)(O)OZ), and —C(O)OZ, wherein Z is selected from the group consisting of —H and Cl$^+$ wherein Cl$^+$ is a counterion; and R$^2$, R$^3$, R$^4$ are independently selected from the group consisting of —H, C$_1$-C$_{20}$ hydrocarbyl, C$_4$-C$_{20}$ aryl, and C$_1$-C$_{20}$ heteroaryl, wherein the hydrocarbyl, aryl, and heteroaryl group is substituted or unsubstituted, wherein the hydrocarbyl group is optionally interrupted by 1, 2, or 3 heteroatoms independently selected from O, S, and substituted or unsubstituted N.

Embodiment 82 provides the method of any one of Embodiments 1-81, wherein the scale-inhibiting compound is a polymer formed from at least one of acrylic acid, aspartic acid, fumaric acid, methacrylic acid, hydroxypropyl acrylic acid, vinyl phosphonic acid, vinylidene diphosphonic acid, maleic anhydride, itaconic acid, crotonic acid, maleic acid, mesoconic acid, citraconic acid, styrene sulfonic acid, allyl sulfonic acid, methallyl sulfonic acid, vinyl sulfonic acid, and a salt thereof.

Embodiment 83 provides the method of any one of Embodiments 1-82, wherein the scale-inhibiting compound is at least one of hexamethylenediamine tetrakis(methylene phosphonic acid), poly(aspartic acid) (PASP), diethylenetriamine tetra(methylene phosphonic acid), diethylenetriamine pentakis(methylene phosphonic acid), 2-phosphonobutane-1,2,4-tricarboxylic acid, polyacrylic acid (PAA), phosphinocarboxylic acid (PPCA), diglycolamine phosphonate (DGA phosphonate), 1-hydroxyethylidene-1,1-diphosphonate (HEDP phosphonate), bisaminoethylether phosphonate (BAEE phosphonate), 2-acrylamido-2-methyl-1-propanesulphonic acid (AMPS), acrylic acid-hydroxypropyl acrylate copolymer, hydrolyzed poly(maleic anhydride) (HPMA), maleic anhydride-acrylic acid copolymer (e.g., hydrolyzed, MA/AA), and acrylic acid-2-acrylamino-2-methylpropane sulfonic acid copolymer (AA/AMPS).

Embodiment 84 provides the method of any one of Embodiments 1-83, wherein the scale-inhibiting compound and the secondary material have a molar ratio of about 1:0.01 to about 1:100 in the cocrystals.

Embodiment 85 provides the method of any one of Embodiments 1-84, wherein the scale-inhibiting compound and the secondary material have a molar ratio of about 1:1 or about 1:2 in the cocrystals.

Embodiment 86 provides the method of any one of Embodiments 1-85, wherein the secondary material is different from the scale-inhibiting compound.

Embodiment 87 provides the method of any one of Embodiments 1-86, wherein the secondary material is less scale-inhibiting than the scale-inhibiting compound.

Embodiment 88 provides the method of any one of Embodiments 1-87, wherein the secondary material is at least one of a substantially non-scale-inhibiting material and a substantially inert material.

Embodiment 89 provides the method of any one of Embodiments 1-88, wherein the secondary material is a scale-inhibiting material that is different than the scale-inhibiting compound.

Embodiment 90 provides the method of any one of Embodiments 1-89, wherein the secondary material is at least one of a compound and an elemental material.

Embodiment 91 provides the method of any one of Embodiments 1-90, wherein the secondary material is a scale-inhibiting compound comprising at least one of a —P(O)(OZ)OZ, —S(O)(O)OZ), and a —C(O)OZ group, where Z is independently selected from —H and Cl⁺, wherein Cl⁺ is a counterion.

Embodiment 92 provides the method of any one of Embodiments 1-91, wherein the secondary material is at least one of hexamethylenediamine tetrakis(methylene phosphonic acid), poly(aspartic acid) (PASP), diethylenetriamine tetra(methylene phosphonic acid), diethylenetriamine pentakis(methylene phosphonic acid), 2-phosphonobutane-1,2,4-tricarboxylic acid, polyacrylic acid (PAA), phosphinocarboxylic acid (PPCA), diglycolamine phosphonate (DGA phosphonate), 1-hydroxyethylidene-1,1-diphosphonate (HEDP phosphonate), bisaminoethylether phosphonate (BAEE phosphonate), 2-acrylamido-2-methyl-1-propanesulphonic acid (AMPS), acrylic acid-hydroxypropyl acrylate copolymer, hydrolyzed poly(maleic anhydride) (HPMA), maleic anhydride-acrylic acid copolymer (e.g., hydrolyzed, MA/AA), and acrylic acid-2-acrylamino-2-methylpropane sulfonic acid copolymer (AA/AMPS).

Embodiment 93 provides the method of any one of Embodiments 1-92, wherein the secondary material is at least one of acetylsalicylic acid, adipic acid, 4-aminobenzoic acid, 4-aminobenzamide, anthranillic acid, arabinose, arginine, ascorbic acid, aspartic acid, benzamide, benzenesulfonic acid, benzoic acid, boric acid, calcium chloride, camphoric acid, cholic acid, citric acid, cyclamic acid, erythritol, fructose, fumaric acid, gentisic acid, glucose, glucoronic acid, gluconic acid, glutamic acid, glutaric acid, glycine, glycolamide, glycolic acid, hippuric acid, 4-hydroxybenzamide, 4-hydroxybenzoic acid, 1-hydroxy-2-naphthoic acid, imidazole, isonicotinamide, ketoglutaric acid, lactamide, lactic acid, lactose, laurylsulfonic acid, lysine, magnesium chloride, maleic acid, malic acid, malonic acid, maltose, mandelic acid, mannitol, mannose, methyl-4-hydroxybenzoic acid, neotame, nicotinamide, nicotinic acid, orcinol, oxalic acid, 2-oxoglutaric acid, palmoic acid, pimelic acid, piperazine, proline, pyroglutamic acid, resourcinol, saccharin, salicylic acid, sebacic acid, sorbic acid, sorbitol, stearic acid, suberic acid, succinic acid, sucrose, tartaric acid, threonine, thromethamine, cinnamic acid, trimesic acid, tyrosine ethyl ester, tyrosine, urea, 2,4,6-trinitrotoluene (TNT), octahydro-1,3,5,7-tetranitro-1,3,5,7-tetrazocine (HMX), 2,4,6,8,10,12-hexanitro-2,4,6,8,10,12-hexaazaisowurtzitane (HNIW or CL-20), 1,3,5-trinitroperhydro-1,3,5-triazine (RDX), nitroglycerin, nitrocellulose, [3-nitrooxy-2,2-bis(nitrooxymethyl)propyl]nitrate or pentaerythritol tetranitrate (PETN), benzotrifuroxan (BTF), N-methyl-2-pyrrolidone, 2,4-dinitro-2,4-diazapentane, 1,2-phenylenediamine, 2-bromoaniline, 3,4-diaminotoluene, 4-fluoroaniline, thieno[3,2-b]thiophene, 2-pyrrolidone, 2-picoline-N-oxide, 4-picoline-N-oxide, naphthalene, 1-bromonaphthalene, 9-bromonaphthalene, anthracene, 9-bromoanthracene, phenanthrene, perylene, tetrathiafulvalene, phenothiazine, dibenzothiophene, 4,6-dimethyldibenzothiophene, 1,2-phenylenediamine, 1,4-dimethyoxybenzene, 4-aminobenzoic acid, 1,4-piperazinedicarboxaldehyde, anthranilic acid, pyrene, caprolactam, $H_2O$, $CO_2$, dimethylformamide (DMF), 1,4-dioxane, γ-butyrolactone, and hexamethylphosphoramide.

Embodiment 94 provides the method of any one of Embodiments 1-93, wherein the secondary material is at least one secondary material disclosed herein.

Embodiment 95 provides the method of any one of Embodiments 1-94, further comprising combining the composition with an aqueous or oil-based fluid comprising a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof, to form a mixture, wherein the placing the compound in the subterranean formation comprises placing the mixture in the subterranean formation.

Embodiment 96 provides the method of Embodiment 95, wherein the cementing fluid comprises Portland cement, pozzolana cement, gypsum cement, high alumina content cement, slag cement, silica cement, or a combination thereof.

Embodiment 97 provides the method of any one of Embodiments 1-96, wherein at least one of prior to, during, and after the placing of the compound in the subterranean formation, the composition is used downhole, at least one of alone and in combination with other materials, as a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof.

Embodiment 98 provides the method of any one of Embodiments 1-97, wherein the composition further comprises water, saline, aqueous base, oil, organic solvent, synthetic fluid oil phase, aqueous solution, alcohol or polyol, cellulose, starch, alkalinity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, gas, weight reducing additive, heavy-weight additive, lost circulation material, filtration control additive, dispersant, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement fly ash, metakaolin, shale, zeolite, a crystalline silica compound, amorphous silica, fibers, a hydratable clay, microspheres, pozzolan lime, or a combination thereof.

Embodiment 99 provides a method of treating a subterranean formation, the method comprising: obtaining or providing a composition comprising cocrystals, each cocrystal independently comprising a scale-inhibiting compound; and a secondary material; and a compound comprising at least one of chromium, aluminum, antimony, zirconium, titanium, calcium, boron, iron, silicon, copper, zinc, magnesium, and an ion thereof; and placing the composition in a subterranean formation.

Embodiment 100 provides a system comprising: a composition comprising cocrystals, each cocrystal independently comprising a scale-inhibiting compound; and a secondary material; and a subterranean formation comprising the composition therein.

Embodiment 101 provides a composition for treatment of a subterranean formation, the composition comprising: cocrystals, each cocrystal independently comprising a scale-inhibiting compound; and a secondary material.

Embodiment 102 provides the composition of Embodiment 101, wherein the composition further comprises a downhole fluid.

Embodiment 103 provides the composition of any one of Embodiments 101-102, wherein the composition is a composition for fracturing of a subterranean formation.

Embodiment 104 provides a method of preparing a composition for treatment of a subterranean formation, the method comprising: forming a composition comprising cocrystals, each cocrystal independently comprising a scale-inhibiting compound; and a secondary material.

Embodiment 104 provides the apparatus or method of any one or any combination of Embodiments 1-103 optionally configured such that all elements or options recited are available to use or select from.

What is claimed is:

1. A method of treating a subterranean formation, the method comprising:
    placing in a subterranean formation a composition comprising cocrystals, each cocrystal independently comprising:
       a scale-inhibiting compound; and
       a secondary material,
       wherein
       (A) the cocrystal is formed in a forming method selected from the group consisting of
          (i) a melting method comprising the steps of
             (a) melting and blending together the scale-inhibiting compound and the secondary material to form a blend and
             (b) allowing the blend to cool and recrystallize to form the cocrystal, and
          (ii) a dissolving method comprising the steps of
             (a) dissolving the scale-inhibiting compound and the secondary material in a solution and
             (b) (1) allowing the solution to evaporate to form the cocrystal, or (2) reducing the solubility of the scale-inhibiting compound and the secondary material in the solution to form the cocrystal and
       (B) the scale-inhibiting compound and the secondary material are present in the cocrystal at a mole ratio of about 1:0.01 to about 1:100; and
    exposing at least some of the cocrystals to a compression wave to dissociate the scale-inhibiting compound from the cocrystal to provide a released scale-inhibiting compound.

2. The method of claim 1, wherein the method comprises hydraulic fracturing or a squeeze operation.

3. The method of claim 2, further comprising treating the subterranean formation with the released scale-inhibiting compound to provide scale inhibition, wherein the scale inhibition comprises a reaction between scale-forming materials and the released scale-inhibiting compound.

4. The method of claim 1, wherein the composition further comprises a viscosifier comprising a gel or crosslinked gel.

5. The method of claim 1, wherein the cocrystal comprises a crystalline structure comprising a unit cell comprising both the scale-inhibiting compound and the at least one secondary material.

6. The method of claim 5, wherein the crystalline structure is different from a crystal structure of a crystal of the scale-inhibiting compound alone and different from a crystal structure of a crystal of the secondary material alone.

7. The method of claim 1, wherein the cocrystals are at least partially coated on a proppant.

8. The method of claim 1, wherein the cocrystals are at least partially encapsulated by a protective shell.

9. The method of claim 1, wherein the scale-inhibiting compound is at least one of a phosphonate, phosphate, sulfonate, acrylate, and a carboxylate.

10. The method of claim 1, wherein the scale-inhibiting compound comprises at least one of a —P(O)(OZ)OZ, —S(O)(O)OZ, and a —C(O)OZ group, wherein each Z is independently selected from the group consisting of —H and $Cl^+$, and wherein $Cl^+$ is a counterion.

11. The method of claim 1, wherein the scale-inhibiting compound is a polymer formed from a compound having one of the following structures:

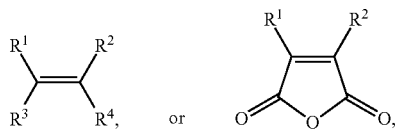

wherein:
    $R^1$ is selected from the group consisting of —P(O)(OZ)OZ,
       —S(O)(O)OZ, —C(O)OZ, $C_1$-$C_{20}$ hydrocarbyl, $C_4$-$C_{20}$ aryl, and $C_1$-$C_{20}$ heteroaryl, wherein the hydrocarbyl, aryl, and heteroaryl group is substituted or unsubstituted, wherein the hydrocarbyl group is optionally interrupted by 1, 2, or 3 heteroatoms independently selected from O, S, and substituted or unsubstituted N, wherein the hydrocarbyl, aryl, and heteroaryl group is substituted by at least one group selected from the group consisting of —P(O)(OZ)OZ, —S(O)(O)OZ, and —C(O)OZ, wherein each Z is independently selected from the group consisting of H and $Cl^+$, and wherein $Cl^+$ is a counterion; and
    $R^2$, $R^3$, $R^4$ are independently selected from the group consisting of —H, $C_1$-$C_{20}$ hydrocarbyl, $C_4$-$C_{20}$ aryl, and $C_1$-$C_{20}$ heteroaryl, wherein the hydrocarbyl, aryl, and heteroaryl group is substituted or unsubstituted, and wherein the hydrocarbyl group is optionally interrupted by 1, 2, or 3 heteroatoms independently selected from O, S, and substituted or unsubstituted N.

12. The method of claim 1, wherein the scale-inhibiting compound comprises at least one of the following structures as a repeating unit:

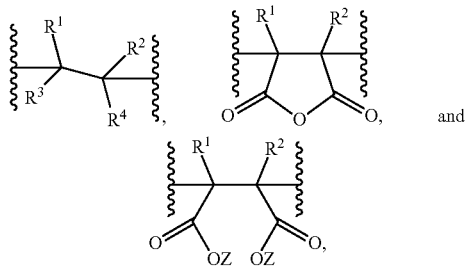

and wherein:
    $R^1$ is selected from the group consisting of —P(O)(OZ)OZ,
       —S(O)(O)OZ, —C(O)OZ, $C_1$-$C_{20}$ hydrocarbyl, $C_4$-$C_{20}$ aryl, and $C_1$-$C_{20}$ heteroaryl, wherein the hydrocarbyl, aryl, and heteroaryl group is substituted or unsubstituted, wherein the hydrocarbyl group is optionally interrupted by 1, 2, or 3 heteroatoms independently selected from O, S, and substituted or unsubstituted N, wherein the hydrocarbyl, aryl, and heteroaryl group is substituted by at least one group selected from the group consisting of —P(O)(OZ)OZ, —S(O)(O)OZ, and —C(O)OZ, wherein each Z is independently selected from the group consisting of —H and Cl⁺, and wherein Cl⁺ is a counterion; and $R^2$, $R^3$, $R^4$ are independently selected from the group consisting of —H, $C_1$-$C_{20}$ hydrocarbyl, $C_4$-$C_{20}$ aryl, and $C_1$-$C_{20}$ heteroaryl, wherein the hydrocarbyl, aryl, and heteroaryl group is substituted or unsubstituted, and wherein the hydrocarbyl group is optionally interrupted by 1, 2, or 3 heteroatoms independently selected from O, S, and substituted or unsubstituted N.

13. The method of claim 1, wherein the scale-inhibiting compound is a polymer formed from at least one of acrylic acid, aspartic acid, fumaric acid, methacrylic acid, hydroxypropyl acrylic acid, vinyl phosphonic acid, vinylidene diphosphonic acid, maleic anhydride, itaconic acid, crotonic acid, maleic acid, mesoconic acid, citraconic acid, styrene sulfonic acid, allyl sulfonic acid, methallyl sulfonic acid, vinyl sulfonic acid, and a salt thereof.

14. The method of claim 1, wherein the scale-inhibiting compound is at least one of hexamethylenediamine tetrakis (methylene phosphonic acid), poly(aspartic acid) (PASP), diethylenetriamine tetra(methylene phosphonic acid), diethylenetriamine pentakis(methylene phosphonic acid), 2-phosphonobutane-1,2,4-tricarboxylic acid, polyacrylic acid (PAA), phosphinocarboxylic acid (PPCA), diglycolamine phosphonate (DGA phosphonate), 1-hydroxyethylidene-1,1-diphosphonate (HEDP phosphonate), bisaminoethylether phosphonate (BAEE phosphonate), 2-acrylamido-2-methyl-1-propanesulphonic acid (AMPS), acrylic acid-hydroxypropyl acrylate copolymer, hydrolyzed poly(maleic anhydride) (HPMA), hydrolyzed maleic anhydride-acrylic acid copolymer (hydrolyzed, MA/AA), and acrylic acid-2-acrylamino-2-methylpropane sulfonic acid copolymer (AA/AMPS).

15. The method of claim 1, wherein the compression wave is produced by an explosion.

16. The method of claim 15, wherein the explosion is produced by a detonator, a primer, or a detonatable material placed downhole in the subterranean formation.

17. The method of claim 1, wherein the compression wave is sent from a surface, down a wellbore, and to the cocrystals in the subterranean formation.

18. A method of treating a subterranean formation, the method comprising:
placing in the subterranean formation a composition comprising:
cocrystals, each cocrystal independently comprising:
a scale-inhibiting compound; and
a secondary material, wherein the scale-inhibiting compound and the secondary material are present in the cocrystal at a mole ratio of about 1:0.01 to about 1:100; and
a crosslinker compound comprising at least one of chromium, aluminum, antimony, zirconium, titanium, calcium, boron, iron, silicon, copper, zinc, magnesium, and an ion thereof, wherein (A) the cocrystal is formed in a forming method selected from the group consisting of
  (i) a melting method comprising the steps of
    (a) melting and blending together the scale-inhibiting compound and the secondary material, in the presence of the crosslinker compound, to form a blend and
    (b) allowing the blend to cool and recrystallize to form the cocrystal, and
  (ii) a dissolving method comprising the steps of
    (a) dissolving the scale-inhibiting compound and the secondary material in a solution, in the presence of the crosslinker compound, and
    (b) (1) allowing the solution to evaporate to form the cocrystal, or (2) reducing the solubility of the scale-inhibiting compound and the secondary material in the solution to form the cocrystal; and exposing at least some of the cocrystals to a compression wave to dissociate the scale-inhibiting compound from the cocrystal.

19. A system comprising:
a tubular disposed in the subterranean formation;
a composition comprising cocrystals that is locatable in the subterranean formation, each cocrystal independently comprising:
a scale-inhibiting compound; and
a secondary material, wherein
(A) the cocrystal is formed in a forming method selected from the group consisting of
  (i) a melting method comprising the steps of
    (a) melting and blending together the scale-inhibiting compound and the secondary material to form a blend and
    (b) allowing the blend to cool and recrystallize to form the cocrystal, and
  (ii) a dissolving method comprising the steps of
    (a) dissolving the scale-inhibiting compound and the secondary material in a solution and
    (b) (1) allowing the solution to evaporate to form the cocrystal, or (2) reducing the solubility of the scale-inhibiting compound and the secondary material in the solution to form the cocrystal and
(B) the scale-inhibiting compound and the secondary material are present in the cocrystal at a mole ratio of about 1:0.01 to about 1:100;
a pump configured to pump the composition through the tubular;
a source of a compression wave; and
wherein, when located in the tubular in the subterranean formation, at least some of the cocrystals are exposed to the compression wave for dissociating the scale-inhibiting compound from the cocrystal.

* * * * *